(12) United States Patent
Noyori et al.

(10) Patent No.: US 7,441,828 B2
(45) Date of Patent: Oct. 28, 2008

(54) PEDESTRIAN PROTECTION APPARATUS FOR VEHICLE

(75) Inventors: Keisuke Noyori, Toyota (JP); Kuniaki Hasegawa, Kariya (JP); Yoshihiro Ogura, Toyota (JP); Masanobu Fukukawa, Toyota (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 0 days.

(21) Appl. No.: 11/617,816

(22) Filed: Dec. 29, 2006

(65) Prior Publication Data

US 2008/0001433 A1    Jan. 3, 2008

(30) Foreign Application Priority Data

Jun. 14, 2006 (JP) ............................. 2006-164270
Jun. 14, 2006 (JP) ............................. 2006-164271

(51) Int. Cl.
    *B62D 25/08* (2006.01)
(52) U.S. Cl. .................................. 296/187.04
(58) Field of Classification Search ............ 296/187.04, 296/203.02; 293/102, 132
    See application file for complete search history.

(56) References Cited

U.S. PATENT DOCUMENTS 6,893,064 B2 *  5/2005  Satou ........................ 293/132
7,222,894 B2 *  5/2007  Suwa ......................... 293/102
2002/0125725 A1 *  9/2002  Satou ........................ 293/132
2007/0284915 A1 * 12/2007  Hasegawa et al. ...... 296/187.04
2008/0067838 A1 *  3/2008  Nakamae et al. ....... 296/203.02

FOREIGN PATENT DOCUMENTS

| JP | 2001-277963 A1 | 10/2001 |
| JP | 2002-264741 A1 | 9/2002 |
| JP | 2004-025976 A1 | 1/2004 |
| JP | 2004-203183 A1 | 7/2004 |

* cited by examiner

*Primary Examiner*—H Gutman
(74) *Attorney, Agent, or Firm*—Burr & Brown

(57) ABSTRACT

A pedestrian protection apparatus for a vehicle, including: a plate member, which includes front and rear portions, and which is fixed at the rear portion to the vehicle; and at least one reinforcing bead each formed integrally on the front portion of the plate member and each including a bead-extending portion and a bead-end portion which extends integrally from a rear-side edge of the bead-extending portion for connecting the rear-side edge and the rear portion of the plate member, the apparatus being arranged to sweep a leg portion of a pedestrian that has collided with the front of the vehicle by contact of a front end of the plate member with the leg portion, thereby protecting the leg portion, wherein a connecting portion between the bead-end portion and the rear portion of the plate member is gently curved without being folded.

6 Claims, 17 Drawing Sheets

PEDESTRIAN PROTECTION APPARATUS FOR VEHICLE

The present application is based on Japanese Patent Application Nos. 2006-164270 and 2006-164271 both filed on Jun. 14, 2006, the contents of which are incorporated herein by reference.

BACKGROUND OF THE INVENTION

1. Field of the Invention

The present invention relates in general to a pedestrian protection apparatus for a vehicle, and in particular to an improved structure of the pedestrian protection apparatus disposed at a lower part of a front face of the vehicle and arranged to sweep a lower part of a leg portion of a pedestrian by contact with the lower part of the leg portion of the pedestrian that has collided with or contacted the front face of the vehicle, thereby protecting the leg portion of the pedestrian.

2. Discussion of Related Art

In vehicles such as automotive vehicles, there are conventionally disposed, at a front face, a rear face, or side faces, of the vehicles, various types of protection apparatus which absorb an impact energy generated upon a collision for thereby protecting a vehicle body and vehicle passengers. In recent years, there is disposed, at the front face of the vehicle, an apparatus for protecting a pedestrian upon collision or contact of the pedestrian with the front face of the vehicle.

As one type of the pedestrian protection apparatus, there is known a so-called leg-sweep apparatus which is disposed inside of a front bumper or disposed at a lower part of the front bumper independently of the front bumper. The leg-sweep apparatus is arranged to apply, to a lower part of a leg portion of the pedestrian, a counterforce with respect to an impact load that is inputted upon collision of the pedestrian with the front face of the vehicle and sweep (scoop up) the lower part of the leg portion of the pedestrian, thereby causing the pedestrian to fall down or to be thrown over toward the vehicle. Thus, it is possible to minimize occurrence of injuries to the leg portion of the pedestrian such as bone fractures, thereby assuring protection and safety of the pedestrian.

Examples of the leg-sweep apparatus as one type of the pedestrian protection apparatus are disclosed in a patent publication document 1 (JP-A-2001-277963), a patent publication document 2 (JP-A-2004-25976), and a patent publication document 3 (JP-A-2004-203183), for instance. The pedestrian protection apparatus disclosed in the patent publication document 1 is arranged to be disposed at the lower part of the front of the vehicle and includes: a resin foam body which extends in a vehicle width direction and at least a part of which protrudes from the front face of the vehicle; and a beam member which extends in the vehicle width direction while being in contact with the back surface of the resin foam body. The pedestrian protection apparatus disclosed in the patent publication document 2 is formed of a metal pipe or the like and is fixed to the lower part of the front face of the vehicle so as to extend in the vehicle width direction. The pedestrian protection apparatus disclosed in the patent publication document 3 includes: a plate member located so as to extend in a frontward and backward of the vehicle and fixed to the lower part of the front of the vehicle; and a plurality of flat ribs disposed on a front portion of the plate member so as to extend upright therefrom, so that the front portion of the plate member has an increased rigidity. Further, a rear portion of the plate member has a flat plate-like configuration extending in the frontward and backward direction of the vehicle. The thus constructed apparatus is fixed to the vehicle at a rear-side end section of the rear portion of the plate member. However, the pedestrian protection apparatus disclosed in those documents have drawbacks which should be rectified.

The pedestrian protection apparatus disclosed in the patent publication document 1 needs a large number of components, inevitably pushing up the cost of the components. Further, it is cumbersome to install the apparatus on the vehicle. The pedestrian protection apparatus disclosed in the patent publication document 2 inevitably has a large weight. Further, it is difficult to form the apparatus to have a configuration corresponding to that of the front face of the vehicle.

The pedestrian protection apparatus disclosed in the patent publication document 3 ensures a sufficiently reduced weight where the plate member and the plurality of ribs are formed integrally with each other using a synthetic resin material, for instance. Moreover, the apparatus advantageously achieves excellent formability and a reduction in the number of components by employing, in formation of the plate member and the plurality of ribs, a molding technique using metal dies such as injection molding. Thus, the drawbacks experienced in the pedestrian protection apparatus disclosed in the patent publication documents 1 and 2 are eliminated in the apparatus disclosed in the patent publication document 3. The apparatus disclosed in the patent publication document 3, however, suffers from some obstacles to improvement in impact performance described below.

Namely, the pedestrian protection apparatus disclosed in the patent publication document 3 enables, upon contact with the leg portion of the pedestrian, the impact load in the load characteristics to rise promptly and reach a target value quickly, thus ensuring excellent impact performance that permits a sufficient high degree of counterforce with respect to the impact load to be instantaneously exhibited. To this end, the height of each of the ribs provided on the front portion of the plate member needs to be increased to give sufficient rigidity to the front portion of the plate member to which the impact load is inputted for thereby preventing the front portion from being easily deformed. The increase in the height of each rib, however, increases the weight of the pedestrian protection apparatus as a whole even when the apparatus is constituted by a resin-molded product. In this instance, the merit of the resin-molded product, i.e., lightness, is considerably deteriorated. Further, where the height of each rib is increased, it is required that metal molds to be used in molding be formed with a recessed portion having a large depth for forming each rib. In this instance, it takes additional time to manufacture the metal mold. Moreover, the mold release characteristics may be deteriorated. In consequence, there may be caused a problem of deterioration in manufacturing efficiency of the pedestrian protection apparatus as a whole.

Under the situations mentioned above, a patent publication document 4 (JP-A-2002-264741) discloses a pedestrian protection apparatus in which reinforcing beads are formed integrally on the front portion of the plate member in place of the flat plate-like ribs. Each reinforcing rib includes: an extending portion which extends in a frontward and backward direction of the vehicle with a channel-like configuration that is open downward; and a plate-like end portion which extends integrally from a rear-side edge of the extending portion for connecting the rear-side edge of the extending portion and the rear portion of the plate member. The thus constructed pedestrian protection apparatus ensures the same degree of rigidity at the front portion of the plate member as that ensured when the flat plate-like ribs with a large height are formed integrally on the front portion of the plate member, while keeping the depth or the height of each reinforcing bead relatively small. Accordingly, the pedestrian protection apparatus disclosed in the patent publication document 4 eliminates not only the above-mentioned drawbacks experienced in the pedestrian protection apparatus disclosed in the patent publication documents 1, 2, but also the above-mentioned problem experienced in the pedestrian protection apparatus disclosed in the patent publication document 3.

The inventors of the present invention conducted various experiments and studied the pedestrian protection apparatus disclosed in the patent publication document 4. As a result of the study, it was found that the apparatus had the following drawbacks.

Namely, in the pedestrian protection apparatus disclosed in the patent publication document 4, a connecting portion between the end portion of each reinforcing bead and the rear portion of the plate member is formed as an angular folded or bent portion, so that stress is applied to such folded portion upon inputting of the impact, resulting in comparatively easy flexing deformation of the plate member at a boundary between its front and rear portions at which such folded portion is located. In consequence, there may be caused a delay in rise of the impact load in the load characteristics, rendering it difficult for the impact load to instantaneously reach the target value. Thus, the pedestrian protection apparatus disclosed in the patent publication document 4 does not ensure satisfactory impact performance that permits a sufficiently high degree of counterforce with respect to the impact load to be instantaneously exhibited.

In the pedestrian protection apparatus disclosed in the patent publication document 4, because the connecting portion between the end portion of each reinforcing bead and the rear portion of the plate member is formed as the angular folded portion as described above, the inner (anterior) surface of the end portion assumes a flat plane configuration. Accordingly, during running of a vehicle on which the apparatus is mounted, a portion of the air flow flowing through the lower part of the vehicle in the backward direction, which portion of the air has entered the inside of the reinforcing bead, is brought into hard contact with the inner (anterior) surface of the end portion having the flat plane configuration, thereby causing a large air resistance that may lead to a deterioration in the aerodynamic characteristics of the pedestrian protection apparatus and accordingly of the vehicle.

The inventors of the present invention conceived of providing flat plate-like auxiliary ribs each extending continuously in the frontward and backward direction over the end portion of each reinforcing bead and the front-side end section of the rear portion of the plate member, in an attempt to increase the strength of the plate member with respect to deformation (deformation strength) at its boundary portion between the front and rear portions where the connecting portion (folded potion) between the end portion of each reinforcing bead and the rear portion of the plate member is located.

The inventors have conducted a known collision test using the pedestrian protection apparatus having such auxiliary ribs. The result of the collision test indicated the following: Although the boundary portion between the front and rear portions of the plate member is prevented from being deformed, stress concentrates, upon inputting of the impact load, on two locations at which a front end and a rear end of each auxiliary rib are located because the connecting portion of each auxiliary rib with the plate member has a linear configuration. In this instance, the plate member tends to be easily subjected to flexing deformation at portions thereof corresponding to the above-indicated two locations at which the front and rear ends of each auxiliary rib are respectively located, thus rendering it difficult for the pedestrian protection apparatus to ensure the desired impact performance as described above.

SUMMARY OF THE INVENTION

The present invention was made in the light of the above-described situations. It is therefore an object of the invention to provide a pedestrian protection apparatus for a vehicle which is capable of effectively ensuring excellent impact performance that permits a sufficient high degree of counterforce with respect to the impact load to be instantaneously exhibited.

The above-indicated object of the present invention may be attained according to a first aspect of the invention, which provides a pedestrian protection apparatus for a vehicle, comprising: a plate member which is disposed at a lower part of a front of the vehicle so as to extend in a frontward and backward direction of the vehicle, which includes a front portion and a rear portion, and which is fixed at the rear portion to the vehicle; and at least one reinforcing bead each formed integrally on the front portion of the plate member and each including a bead-extending portion which extends in the frontward and backward direction of the vehicle with a channel-like configuration that is open upward or downward and a bead-end portion which has a plate-like configuration and which extends integrally from a rear-side edge of the bead-extending portion for connecting the rear-side edge of the bead-extending portion and the rear portion of the plate member, the apparatus being arranged to sweep a leg portion of a pedestrian that has collided with the front of the vehicle by contact of a front end of the plate member with the leg portion of the pedestrian, thereby protecting the leg portion of the pedestrian, wherein a connecting portion between the bead-end portion of each of the at least one reinforcing bead and the rear portion of the plate member is gently curved without being folded.

Unlike the conventional apparatus wherein the connecting portion between the end portion of each reinforcing bead and the rear portion of the plate member is formed as the angular folded portion, the pedestrian protection apparatus constructed as described above does not suffer from stress concentration on one location in the connecting portion upon inputting of the impact. Instead, the stress is distributed over an entirety of the gently curved connecting portion between the bead-end portion of each of the at least one reinforcing bead and the rear portion of the plate member. Thus, the plate member is prevented from being easily subjected to flexing deformation at the boundary portion between its front and rear portions at which the connecting portion between the bead-end portion of each of the at least one reinforcing bead and the rear portion of the plate member is located. As a result, it is possible to effectively avoid occurrence of a delay in the rise of the impact load in the load characteristics arising from such easy flexing deformation of the plate member.

In the above-described pedestrian protection apparatus wherein the connecting portion between the bead-end portion of each of the at least one reinforcing bead and the rear portion of the plate member is formed to have the gently curved configuration without being folded, a section of the inner surface of the bead-end portion, which is nearer to the connecting portion and which is remote from the bead-extending portion, is constituted to have the gently curved configuration. According to the arrangement, when the air flow which flows through the lower part of the vehicle and enters the inside of the reinforcing bead during running of the vehicle on which the present apparatus is mounted is brought into contact with the inner surface of the bead-end portion, the air flow contacted the gently curved section of the inner surface of the bead-end portion can smoothly flow in the backward direction of the vehicle while being guided by the gently curved surface. Accordingly, it is possible to effectively prevent the air flow entered the inside of the reinforcing bead from being brought into hard contact with respect to the entirety of the inner surface of the bead-end portion.

The pedestrian protection apparatus constructed according to the above-indicated first aspect of the invention allows the impact load in the load characteristics to rise promptly and reach the target value quickly, thereby effectively ensuring excellent impact performance that enables a sufficient counterforce to be instantaneously exhibited with respect to the impact load. In addition, the air resistance can be advantageously reduced, effectively achieving an improvement in the aerodynamic characteristics. In consequence, the leg portion of the pedestrian collided with the front face of the vehicle can be promptly and reliably swept, thereby assuring sufficient protection of the leg portion of the pedestrian. Moreover, the present apparatus advantageously assures an improvement in running stability and fuel economy of the vehicle based on excellent aerodynamic characteristics.

The above-indicated object of the present invention may be attained according to a second aspect of the invention, which provides a pedestrian protection apparatus for a vehicle, comprising: a plate member which is disposed at a lower part of a front of the vehicle so as to extend in a frontward and backward direction of the vehicle, which includes a front portion and a rear portion, and which is fixed at the rear portion to the vehicle; and at least one reinforcing bead each formed integrally on the front portion of the plate member and each including a bead-extending portion which extends in the frontward and backward direction of the vehicle with a channel-like configuration that is open upward or downward and a bead-end portion which has a plate-like configuration and which extends integrally from a rear-side edge of the bead-extending portion for connecting the rear-side edge of the bead-extending portion and the rear portion of the plate member, the apparatus being arranged to sweep a leg portion of a pedestrian that has collided with the front of the vehicle by contact of a front end of the plate member with the leg portion of the pedestrian, thereby protecting the leg portion of the pedestrian, the apparatus further comprising at least one first auxiliary bead each having a width smaller than a width of each of the at least one reinforcing bead and each extending continuously in the frontward and backward direction of the vehicle over the bead-end portion of a corresponding one of the at least one reinforcing bead and a front-side end section of the rear portion of the plate member.

In the pedestrian protection apparatus constructed according to the above-described second aspect of the invention, a connecting portion between the bead-end portion of each of the at least one reinforcing bead and the rear portion of the plate member is formed as a bent portion located at a boundary portion between the front and rear portions of the plate member, but there is provided a first auxiliary bead at the bent portion. Accordingly, the present arrangement is effective to prevent occurrence of stress concentration at the bent portion upon inputting of the impact, thereby avoiding deformation of the plate member at the boundary portion between the front and rear portions at which the bent portion is located.

In the present apparatus as described above, a connecting portion of each of the at least one first auxiliary bead with respect to the corresponding reinforcing bead and the rear portion of the plate member assumes a rectangular configuration, unlike the above-indicated arrangement in which the flat reinforcing ribs are provided for increasing the deformation strength of the boundary portion between the front and rear portions of the plate member. Therefore, stress to be generated when the impact is inputted to the plate member is distributed over four locations corresponding to four corner portions of the rectangle constituted by the connecting portion of the first auxiliary bead with respect to the corresponding reinforcing bead and the plate member, thus advantageously reducing or mitigating the stress generated at the four locations. Moreover, each of the at least one first auxiliary bead has a width smaller than the width of each of the at least one reinforcing bead. Therefore, even when the connecting portion of the first auxiliary bead and the rear portion of the plate member is made as the bent portion, it is possible to effectively avoid occurrence of a large magnitude of stress concentration over the entirety of the bent portion upon inputting of the impact. Thus, the plate member is effectively prevented from being easily subjected to flexing deformation at the connecting portion of each first auxiliary rib with respect to the corresponding reinforcing rib and the rear portion of the plate member. As a result, not only the above-indicated boundary portion of the plate member, but also the entirety of the plate member can be prevented from being easily flexed upon inputting of the impact.

The pedestrian protection apparatus constructed according to the above-indicated second aspect of the invention allows the impact load in the load characteristics to rise promptly and reach the target value quickly, thereby effectively ensuring excellent impact performance that enables a sufficient counterforce to be instantaneously exhibited with respect to the impact load. In consequence, the leg portion of the pedestrian collided with the front face of the vehicle can be promptly and reliably swept, thereby assuring sufficient protection of the leg portion of the pedestrian.

FORMS OF THE INVENTION

The present invention is preferably practiced in at least the following forms.

(1) A pedestrian protection apparatus for a vehicle, comprising: a plate member which is disposed at a lower part of a front of the vehicle so as to extend in a frontward and backward direction of the vehicle, which includes a front portion and a rear portion, and which is fixed at the rear portion to the vehicle; and at least one reinforcing bead each formed integrally on the front portion of the plate member and each including a bead-extending portion which extends in the frontward and backward direction of the vehicle with a channel-like configuration that is open upward or downward and a bead-end portion which has a plate-like configuration and which extends integrally from a rear-side edge of the bead-extending portion for connecting the rear-side edge of the bead-extending portion and the rear portion of the plate member, the apparatus being arranged to sweep a leg portion of a pedestrian that has collided with the front of the vehicle by contact of a front end of the plate member with the leg portion of the pedestrian, thereby protecting the leg portion of the pedestrian, wherein a connecting portion between the bead-end portion of each of the at least one reinforcing bead and the rear portion of the plate member is gently curved without being folded.

(2) The apparatus according to the above form (1), wherein the bead-end portion of each of the at least one reinforcing bead is an inclined flat plate or an inclined curved plate extending from the rear-side edge of the bead-extending portion toward the rear portion of the plate member. According to this form, the air flow entered the inside of each of the at least one reinforcing bead and contacted the inner surface of its bead-end portion can smoothly flow in the backward direction of the vehicle while being guided by the entirety of the inner surface of the bead-end portion, whereby the air resistance can be advantageously reduced, improving the aerodynamic characteristics.

(3) The apparatus according to the above form (1) or (2), wherein a boundary portion between the bead-extending portion and the bead-end portion of each of the at least one reinforcing bead is gently curved without being folded. Unlike the arrangement wherein the boundary portion between the extending portion and the end portion of each reinforcing bead is formed as the angular folded portion, the arrangement according to this form does not suffer from stress concentration on one location in the boundary portion upon inputting of the impact. Instead, the stress is distributed over an entirety of the gently curved boundary portion between the bead-extending portion and the bead-end portion of each of the at least one reinforcing bead. Thus, the plate member is prevented from being easily subjected to flexing deformation, assuring, with high reliability, excellent impact performance that permits a sufficient counterforce to be instantaneously exhibited with respect to the impact load.

(4) The apparatus according to any one of the above forms (1)-(3), wherein each of the at least one reinforcing bead further includes, at a forward end thereof, a forward wall portion which is formed integrally with the bead-extending portion of a corresponding one of the at least one reinforcing bead, which has a front surface extending in a vertical direction, and which constitutes at least a part of the front end of the plate member. According to this form, the impact load generated by collision of the leg portion of the pedestrian is inputted generally perpendicularly to the forward wall portion which constitutes at least a part of the front end of the plate member, for instance. In the arrangement, it is possible to avoid generation of a force which acts on the front portion of the plate member so as to lift the front portion upward or lower the front portion downward. Thus, the arrangement allows the impact load in the load characteristics to be raised promptly and reach the target value quickly, thereby effectively ensuring excellent impact performance that enables a sufficient counterforce to be instantaneously exhibited with respect to the impact load.

(5) A pedestrian protection apparatus for a vehicle, comprising: a plate member which is disposed at a lower part of a front of the vehicle so as to extend in a frontward and backward direction of the vehicle, which includes a front portion and a rear portion, and which is fixed at the rear portion to the vehicle; and at least one reinforcing bead each formed integrally on the front portion of the plate member and each including a bead-extending portion which extends in the frontward and backward direction of the vehicle with a channel-like configuration that is open upward or downward and a bead-end portion which has a plate-like configuration and which extends integrally from a rear-side edge of the bead-extending portion for connecting the rear-side edge of the bead-extending portion and the rear portion of the plate member, the apparatus being arranged to sweep a leg portion of a pedestrian that has collided with the front of the vehicle by contact of a front end of the plate member with the leg portion of the pedestrian, thereby protecting the leg portion of the pedestrian, the apparatus further comprising at least one first auxiliary bead each having a width smaller than a width of each of the at least one reinforcing bead and each extending continuously in the frontward and backward direction of the vehicle over the bead-end portion of a corresponding one of the at least one reinforcing bead and a front-side end section of the rear portion of the plate member.

(6) The pedestrian protection apparatus according to the above form (5), further comprising at least one second auxiliary bead each of which has a width smaller than a width of each of the at least one reinforcing bead and each of which is formed integrally with the bead-extending portion of a corresponding one of the at least one reinforcing bead so as to extend in the frontward and backward direction of the vehicle. According to this form, each of the at least one reinforcing bead is reinforced by the corresponding second auxiliary bead, thereby effectively increasing the rigidity of the front portion of the plate member on which the reinforcing bead is provided. As a result, it is possible to effectively obtain excellent impact performance that permits a sufficient counterforce to be instantaneously exhibited with respect to the impact load.

(7) The apparatus according to the above form (6), wherein each of the at least one second auxiliary bead has a channel-like configuration that is open in a direction opposite to a direction in which each of the at least one reinforcing bead is open. According to this form, where each of the at least one reinforcing bead has a channel-like configuration that is open upward, each of the at least one second auxiliary bead is constructed to have a channel-like configuration that is open downward. On the other hand, where each of the at least one reinforcing bead has a channel-like configuration that is open downward, each of the at least one second auxiliary bead is constructed to have a channel-like configuration that is open upward. Therefore, the provision of the second auxiliary bead on the bead-extending portion of the reinforcing bead does not increase the height or the depth of the reinforcing bead, avoiding an increase in the size of the plate member as a whole. Thus, the arrangement according to this form effectively attains an improvement in the impact performance without an increase in the size of the apparatus as a whole and an increase in the size of the metal mold to be used for forming the apparatus.

(8) The apparatus according to the above form (6) or (7), wherein each of the at least one first auxiliary bead is continuous with a corresponding one of the at least one second auxiliary bead.

(9) The apparatus according to any one of the above forms (5)-(8), wherein the at least one reinforcing bead comprises a plurality of reinforcing beads provided on the front portion of the plate member so as to be spaced apart from each other in a width direction of the vehicle, and wherein the apparatus further comprises at least one third auxiliary bead each of which has a width smaller than a width of each of the plurality of reinforcing beads and each of which is formed between any adjacent two of the plurality of reinforcing blades so as to extend continuously in the frontward and backward direction of the vehicle over a rear-side end section of the front portion of the plate member and the front-side end section of the rear portion of the plate member. According to this form, at the boundary portion between the front and rear portions of the plate member, there is provided at least one third auxiliary bead between any two of the plurality of reinforcing beads which are adjacent to each other in the width direction of the vehicle, thereby assuring increased strength of the boundary portion of the plate member with respect to flexing deformation. In consequence, it is possible to effectively obtain excellent impact performance that permits a sufficient counterforce to be instantaneously exhibited with respect to the impact load.

(10) The apparatus according to any one of the above forms (5)-(8), wherein the at least one reinforcing bead comprises a plurality of reinforcing beads provided on the front portion of the plate member so as to be spaced apart from each other in a width direction of the vehicle, and wherein the apparatus further comprises at least one fourth auxiliary bead each of which has a width smaller than a width of each of the plurality of reinforcing beads and each of which is formed between any adjacent two of the plurality of reinforcing beads so as to extend continuously in the frontward and backward direction of the vehicle at a front-side end section of the front portion of the plate member. The arrangement effectively increases the rigidity of the front portion of the plate member, advantageously attaining the desired impact performance described above.

(11) The apparatus according to any one of the above forms (5)-(8), wherein the at least one reinforcing bead comprises a plurality of reinforcing beads provided on the front portion of the plate member so as to be spaced apart from each other in a width direction of the vehicle, and wherein the apparatus further comprises: at least one third auxiliary bead each of which has a width smaller than a width of each of the plurality of reinforcing beads and each of which is formed between any adjacent two of the plurality of reinforcing beads so as to extend continuously in the frontward and backward direction of the vehicle over a rear-side end section of the front portion of the plate member and a front-side end section of the rear portion of the plate member; and at least one fourth auxiliary bead each of which has a width smaller than the width of each of the plurality of reinforcing beads and each of which is formed between any adjacent two of the plurality of reinforcing beads so as to extend in the frontward and backward direction of the vehicle at the front-side end section of the front portion of the plate member, each of the at least one third auxiliary bead being continuous with a corresponding one of the at least one fourth auxiliary bead.

(12) The apparatus according to any one of the above forms (5)-(11), wherein each of the at least one reinforcing bead further includes, at a forward end thereof, a forward wall portion which is formed integrally with the bead-extending portion of a corresponding one of the at least one reinforcing bead, which has a front surface extending in a vertical direction, and which constitutes at least a part of the front end of the plate member. According to this form, the impact load generated by collision of the leg portion of the pedestrian is inputted generally perpendicularly to the forward wall portion which constitutes at least a part of the front end of the plate member, for instance. In the arrangement, it is possible to avoid generation of a force which acts on the front portion of the plate member so as to lift the front portion upward or lower the front portion downward. Thus, the arrangement allows the impact load in the load characteristics to be raised promptly and reach the target value quickly, thereby effectively ensuring excellent impact performance that enables a sufficient counterforce to be instantaneously exhibited with respect to the impact load.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

To further clarify the present invention, there will be described in detail embodiments of the invention with reference to the accompanying drawings.

1. First Embodiment

Figure 1:
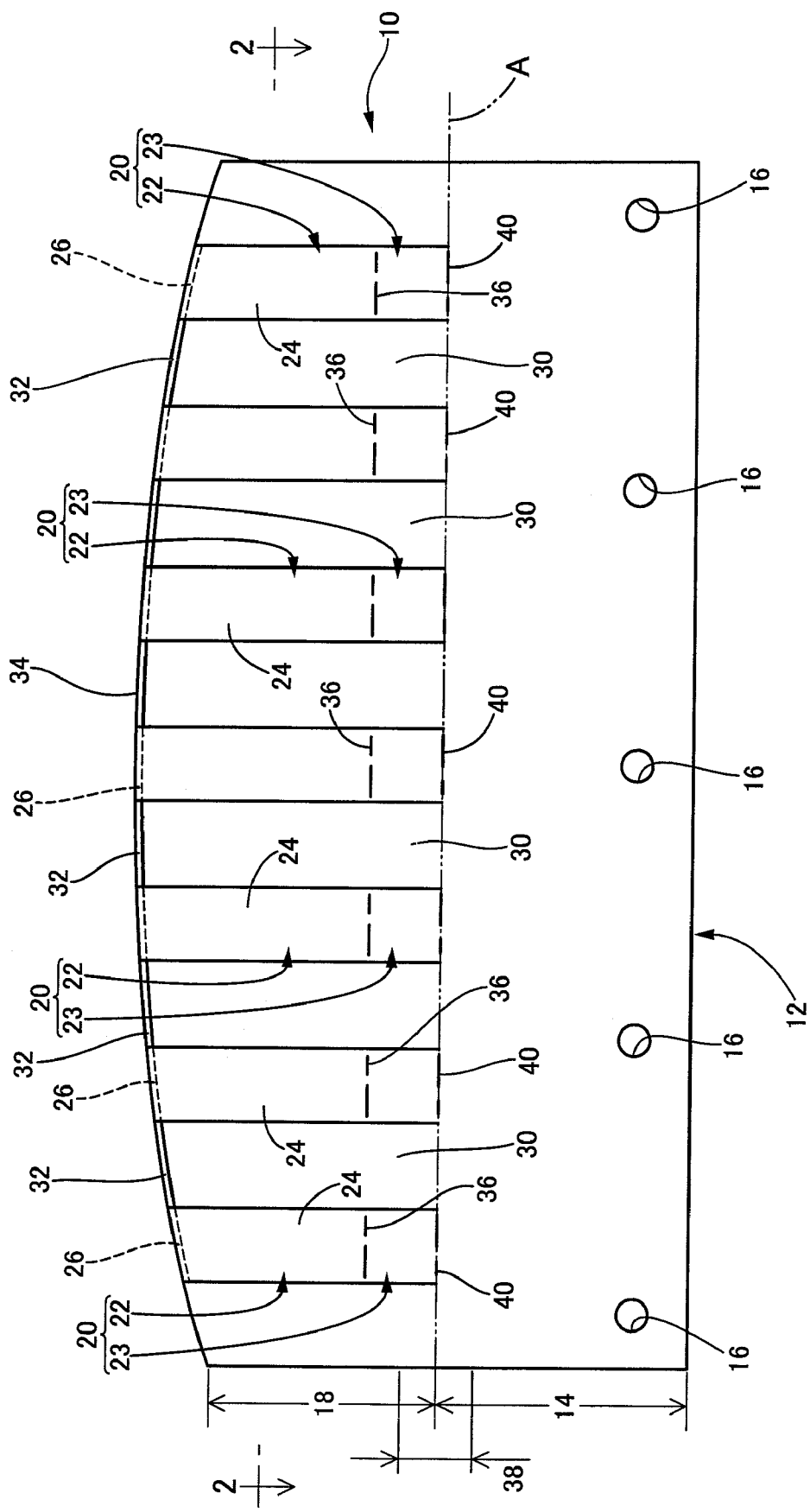
FIG. 1 is a top plan view showing a pedestrian protection apparatus constructed according to a first embodiment of the invention.
Figure 2:
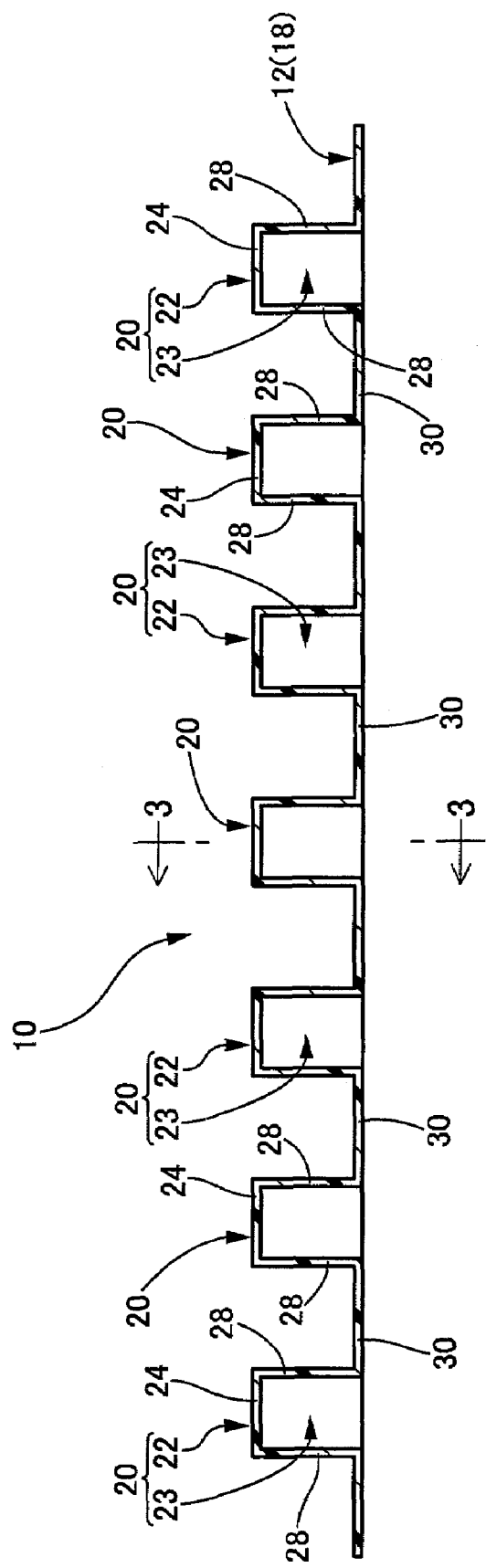
FIG. 2 is a cross sectional view taken along line 2-2 of FIG. 1.

Referring first to FIGS. 1 and 2, there will be explained a leg-sweep apparatus as a pedestrian protection apparatus constructed according to a first embodiment of the present invention. The leg-sweep apparatus generally indicated at 10 in FIGS. 1 and 2 is arranged to be installed inside of a front bumper which is disposed at a front face of an automotive vehicle. As apparent from FIGS. 1 and 2, the present leg-sweep apparatus 10 includes a base plate 12 as a plate member The base plate 12 is formed of a synthetic resin material such as polypropylene or ABS resin and is constituted by a thin planar plate having a generally rectangular shape. In the base plate 12, the dimension as measured in a direction extending in a leftward and rightward direction in FIG. 1, i.e., the dimension as measured in a vehicle width direction or a leftward and rightward (lateral) direction of the vehicle under installation of the leg-sweep apparatus 10 on the vehicle, is made smaller than the vehicle width by a suitable amount, and the dimension as measured in a direction extending in an upward and downward direction in FIG. 1, i.e., the dimension as measured in a frontward and backward direction of the vehicle (a vehicle length or running direction), is made sufficiently smaller than the above-indicated dimension as measured in the leftward and rightward direction. Hereinafter, the above-indicated direction extending in the leftward and rightward direction of the vehicle is referred to as "the leftward and rightward direction" while the above-indicated direction extending in the frontward and backward direction of the vehicle is referred to as "the frontward and backward direction".

In the base plate 12, a rear portion which occupies a substantially rear half region thereof is made as a flat portion 14 which has a flat plate-like configuration and which includes an upper surface and a lower surface that extend horizontally under installation of the leg-sweep apparatus 10 on a vehicle. At a rear-side end of the flat portion 14, a plurality of insertion holes 16 (here, five insertion holes 16) into each of which a suitable fixing bolt is insertable are formed through the thickness of the flat portion 14 such that the insertion holes 16 are spaced apart from each other by a suitable distance in the leftward and rightward direction.

A front portion of the base plate 12 except for the flat portion 14 is made as a reinforcing portion 18 having a reinforcement structure. Namely, there are formed a plurality of reinforcing beads 20 (here, seven reinforcing beads 20) integrally on an intermediate region of the reinforcing portion 18 except both side-end regions thereof in the leftward and rightward direction. The reinforcing beads 20 are adjacent to and spaced apart from each other by a constant distance in the leftward and rightward direction and provide a sufficient reinforcement structure.

Figure 3:
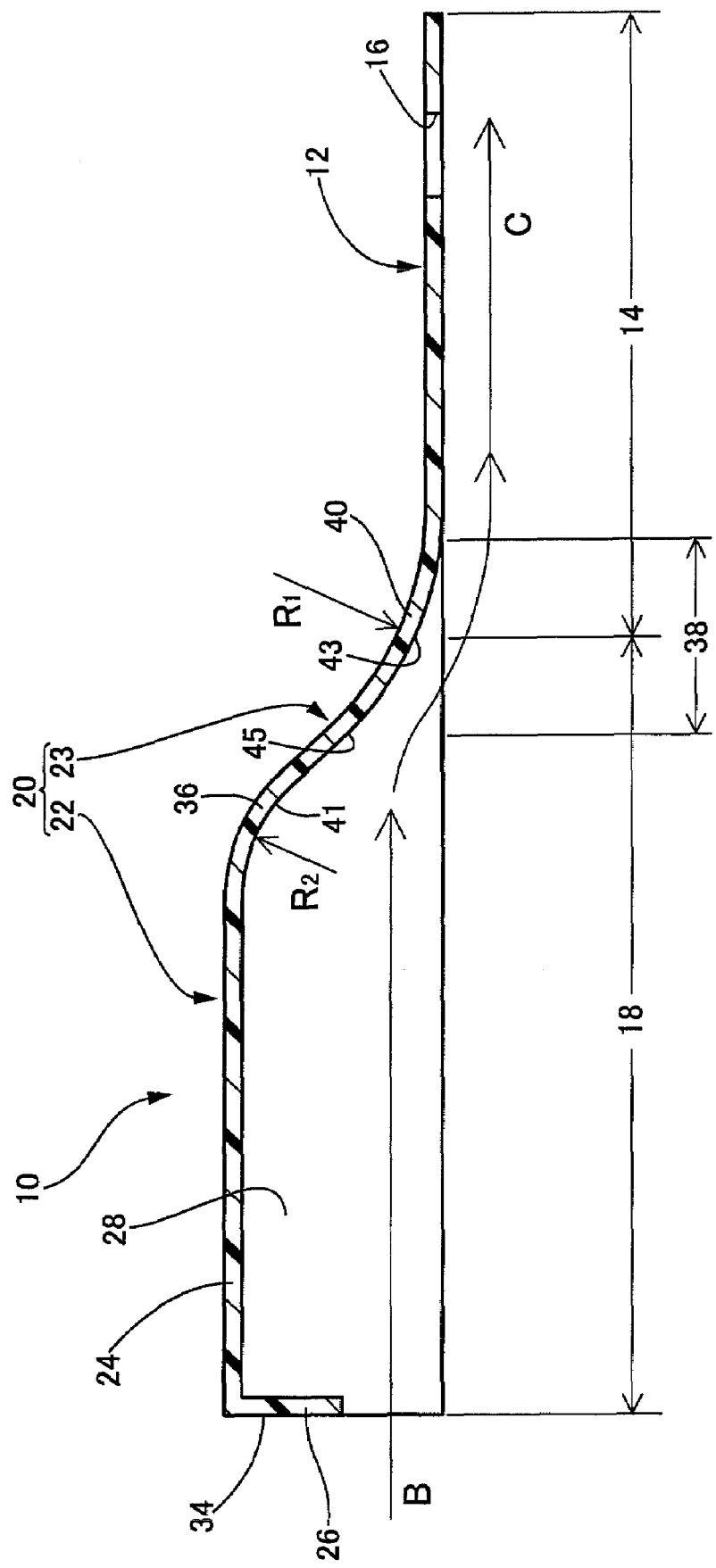
FIG. 3 is an enlarged cross sectional view taken along line 3-3 of FIG. 2.

In detail, each reinforcing bead 20 is constituted by including a bead-extending portion 22 which extends continuously in the frontward and backward direction and a bead-end portion 23 which extends from a rear-side edge of the bead-extending portion 22, as shown in FIGS. 1-3.

The bead-extending portion 22 of each reinforcing bead 20 includes: an upper bottom wall portion 24; a vertically extending forward wall portion 26; and two side wall portions 28, 28. The upper bottom wall portion 24 generally has a rectangular shape having a comparatively small width and is located at a height position which is higher by a suitable distance than an upper surface of each of flat plane-like side portions 30 (which will be described) and the upper surface of the flat portion 14 which is flush with and continuous with the upper surface of each side portion 30, such that the upper bottom wall portion 24 extends parallel with those upper surfaces and straightly in the frontward and backward direction. Each side portion 30 is interposed between any adjacent two reinforcing beads 20 such that two side portions 30 are located on both sides of arbitrary one of the plurality of reinforcing beads 20.

The vertically extending forward wall portion 26 of each bead-extending portion 22 is a flat plate with a comparatively small and generally rectangular shape having the same width as that of the upper bottom wall portion 24 and a length (i.e., a dimension as measured in the upward and downward direction) that corresponds to substantially half a distance between the upper bottom wall portion 24 and the side portion 30. The vertically extending forward wall portion 26 is formed integrally with the corresponding upper bottom wall portion 24 so as to extend from its front-side edge in a vertically downward direction.

Each of the two side wall portions 28 of the bead-extending portion 22 is an elongate flat plate. The two side wall portions 28 are formed integrally with the corresponding upper bottom wall portion 24 so as to extend downward from respective widthwise opposite side edges of the same 24 with a height that is substantially the same as the distance between the upper bottom wall portion 24 and the side portion 30. Further, the two side wall portions 28 are connected, at upper portions of their front-side edges, integrally to respective widthwise opposite side edges of the vertically extending forward wall portion 26.

In the meantime, the bead-end portion 23 of each reinforcing bead 20 is in the form of an inclined plate which extends from a rear-side edge of the upper bottom wall portion 24 of the corresponding bead-extending portion 22 to a height position of the flat portion 14 while being inclined at a predetermined angle. Each bead-end portion 23 is connected, at its rear-side edge, integrally to a leading end of the flat portion 14 on a boundary line A (indicated by a two-dot line in FIG. 1) between the reinforcing portion 18 and the flat portion 14 of the base plate 12. Further, each bead-end portion 23 is connected, at its widthwise opposite side-edges, integrally to rear-side edges of the respective side wall portions 28 of the bead-extending portion 22.

Thus, each reinforcing bead 20 has a generally rectangular box-like configuration extending upwardly and straightly in the frontward and backward direction with the constant height. In other words, each reinforcing bead 20 has a channel-like configuration that extends straightly in the forward and backward direction with an inverted U-like cross sectional shape which is taken along a plane perpendicular to the frontward and backward direction and which is open downward. The plurality of reinforcing beads 20 are arranged in the intermediate region of the reinforcing portion 18 such that mutually opposing side wall portions 28 of any adjacent two reinforcing beads 20 are spaced apart from each other in the leftward and rightward direction by a predetermined distance with the corresponding side portion 30 interposed therebetween.

In the thus constructed leg-sweep apparatus 10, the plurality of reinforcing beads 20 are formed integrally on the reinforcing portion 18 of the base plate 12, thereby imparting a sufficiently high degree of rigidity to the reinforcing portion 18, i.e., the front portion of the base plate 12. Accordingly, the reinforcing portion 18 has increased strength with respect to flexing deformation.

As apparent from FIG. 1, in the present leg-sweep apparatus 10, there are provided vertically extending forward wall portions 32 formed on the reinforcing portion 18 such that each of the vertically extending forward wall portions 32 is formed integrally with the front-side edge of a corresponding one of the side portions 30 which are located between any adjacent two reinforcing beads 20 so as to extend in the vertically upward direction. The vertically extending forward wall portions 32 are arranged, in the leftward and rightward direction, side by side with the vertically extending forward wall portions 26 provided on the front-side edges of the bead-extending portions 22 of the respective reinforcing beads 20. According to the arrangement, the front surfaces of the vertically extending forward wall portions 26 of the respective reinforcing beads 20 and the front surfaces of the vertically extending forward wall portions 32 of the respective side portions 30 cooperate with one another to provide a single continuous surface configuration in plan view. The thus formed continuous surface is made as a curved convex surface that protrudes frontward corresponding to the inner surface of a bumper cover of a front bumper described below. The front surfaces of the vertically extending wall portions 26, 32 which provide such a continuous curved surface in plan view defines, under installation of the leg-sweep apparatus 10 on the vehicle, an impact-input surface 34 to which is inputted an impact generated upon a collision of a pedestrian against the front face of the vehicle.

As shown in FIGS. 1 and 3, in the present leg-sweep apparatus 10, a rear portion of each reinforcing bead 20 is configured to have a gently curved S-like cross sectional shape taken along a plane perpendicular to the leftward and rightward direction, the rear portion of the reinforcing bead 20 being constituted by the rear-side end section of the bead-extending portion 22 that extends horizontally in the frontward and backward direction and the bead-end portion 23 that assumes an inclined plate form inclining downward in the backward direction.

Namely, a boundary portion between the upper bottom wall portion 24 of the bead-extending portion 22 and the bead-end portion 23 of each reinforcing bead 20 is formed as a curved boundary portion 36 which is gently curved without being folded and which protrudes backward. Further, a connecting portion of the bead-end portion 23 of each reinforcing bead 20 and the leading end of the flat portion 14 is formed as a curved connecting portion 40 which is gently curved without being folded and which protrudes frontward, the connecting portion being located at a boundary portion 38 that extends over the rear-side end section of the reinforcing portion 18 and the front-side end section of the flat portion 14 while including the boundary line A between the reinforcing portion 18 and the flat portion 14 of the base plate 12.

In the arrangement described above, an upper part of the inner surface (front surface) of each bead-end portion 23 is formed as a gently curved concave surface portion 41 protruding backward while a lower part of the inner surface (front surface) of each bead-end portion 23 is formed as a curved convex surface portion 43 protruding frontward. Further, an intermediate part of the inner surface (front surface) of each bead-end portion 23 between the upper part and the lower part is formed as an inclined surface portion 45 inclined downward in the backward direction for connecting the concave curved surface portion 41 and the convex curved surface portion 43.

Under installation of the thus constructed leg-sweep apparatus 10 on the vehicle described below, when a prescribed impact load is inputted to the base plate 12, stress is advantageously distributed over the entirety of the curved boundary portion 36 constituted by the boundary portion between the upper bottom wall portion 24 of the bead-extending portion 22 and the bead-end portion 23 of each reinforcing bead 20 and the entirety of the curved connecting portion 40 constituted by the connecting portion between the bead-end portion 23 of each reinforcing bead 20 and the leading end of the flat portion 14.

Accordingly, the present leg-sweep apparatus 10 effectively eliminates occurrence of stress concentration at those boundary portion and connecting portion, unlike the conventional apparatus in which the boundary portion between the upper bottom wall portion 24 of the bead-extending portion 22 and the bead-end portion 23 of each reinforcing bead 20 and the connecting portion between the bead-end portion 23 of each reinforcing bead 20 and the leading end of the flat portion 14 are formed as angular folded portions.

When the vehicle on which is installed the thus constructed leg-sweep apparatus 10 runs, the air flow entering the inside of each reinforcing bead 20 from underneath the corresponding vertically extending forward wall portion 26 and flowing through the reinforcing bead 20 in a direction indicated by an arrow B in FIG. 3 is brought into contact with the inclined surface portion 45 and the convex curved surface portion 43, in particular, and flows smoothly backward as indicated by an arrow C in FIG. 3 while being guided by the inclined surface portion 45 and the convex curved surface portion 43. In the present leg-sweep apparatus 10, therefore, it is possible to advantageously eliminate or mitigate an increase in the air resistance arising from hard contact of the air flow entering the inside of each reinforcing bead 20 with the inner surface of the bead-end portion 23.

The leg-sweep apparatus 10 constructed as described above advantageously eliminates or mitigates local stress concentration at the base plate 12 upon inputting of the impact load thereto and the increase in the air resistance during running of the vehicle on which the present leg-sweep apparatus 10 is installed. For those features indicated above, a radius of curvature $R_1$ of the curved connecting portion 40 constituted by the connecting portion between the bead-end portion 23 and the leading end of the flat portion 14 is significant. Therefore, it is desirable that the radius of curvature $R_1$ of the curved connecting portion 40 be not smaller than 5 mm, thereby attaining distribution of the stress upon inputting of the impact load and reduction in the air resistance. While an upper limit value of the radius of curvature $R_1$ of the curved connecting portion 40 is not particularly limited, it is desirable that the radius of curvature $R_1$ of the curved connecting portion 40 be not larger than 45 mm for the reasons described below. Namely, where the radius of curvature $R_1$ of the curved connecting portion 40 exceeds 45 mm, the length of the bead-end portion 23 becomes excessively large, undesirably increasing the size (length) of each reinforcing bead 20 including the bead-end portion 23 and accordingly the size (length) of the base plate 12 as a whole. In this instance, the leg-sweep apparatus 10 tends to be large-sized. It is noted that a preferable range of the radius of curvature $R_1$ of the curved connecting portion 40 is from 10 mm to 30 mm.

For reasons similar to those explained above, a radius of curvature $R_2$ of the curved boundary portion 36 constituted by the boundary portion between the upper bottom wall portion 24 of the bead-extending portion 22 and the bead-end portion 23 in each reinforcing bead 20 is preferably held in a range from about 5 mm to about 45 mm, more preferably in a range from about 10 mm to about 30 mm, for instance.

Figure 4:
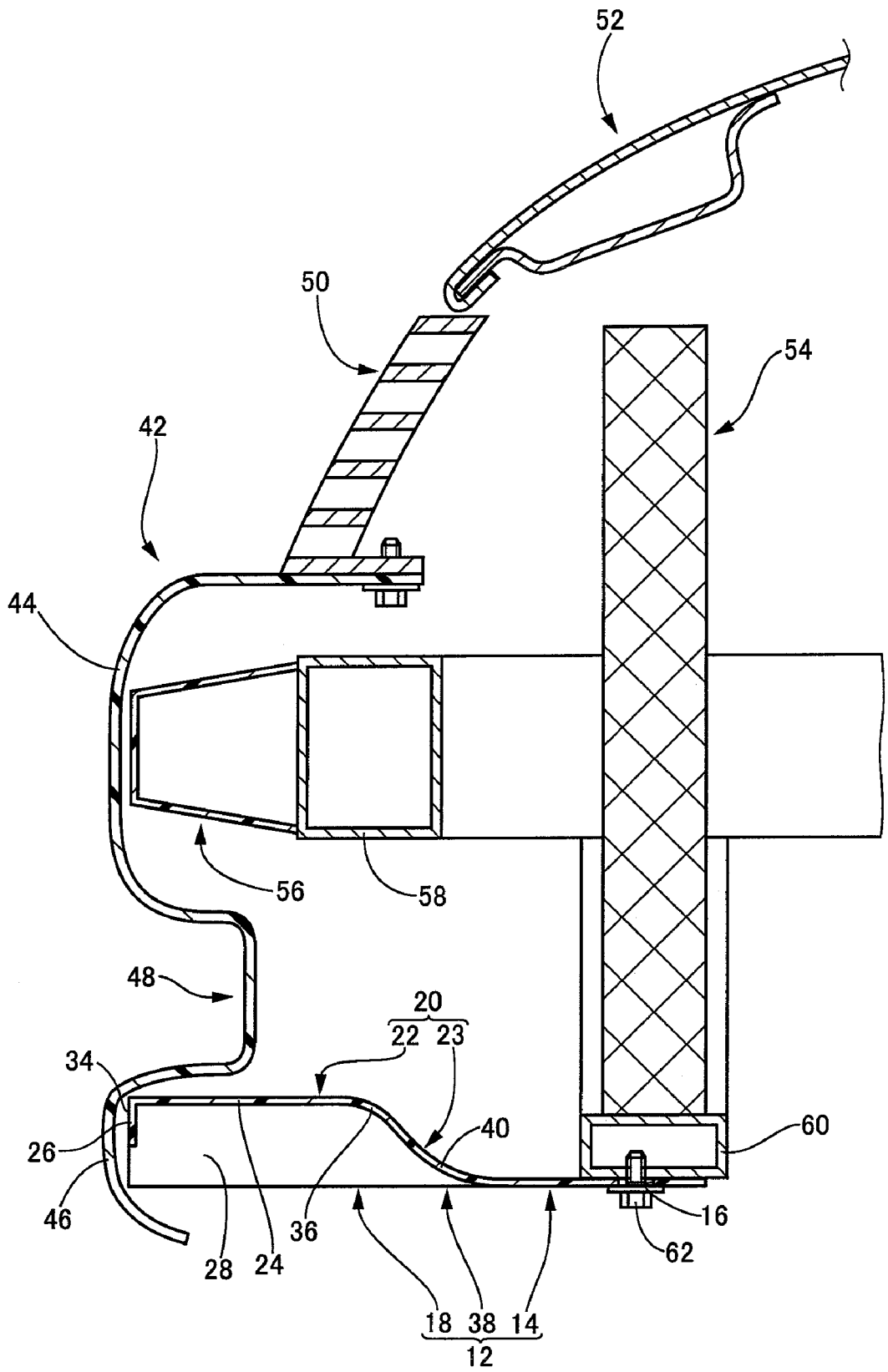
FIG. 4 is an explanatory view showing a state in which the pedestrian protection apparatus of FIG. 1 is installed on a vehicle.

The thus constructed leg-sweep apparatus 10 is disposed inside of a front bumper 42 installed on the front face of the vehicle according to a known structure, as shown in FIG. 4, for example.

The front bumper 42 inside of which is disposed the leg-sweep apparatus 10 has a bumper cover 48 including an upper protruding portion 44 and a lower protruding portion 46 which protrude from the front face of the vehicle in a state in which the front bumper 42 is installed on the front face of the vehicle. Each of the upper and lower protruding portions 44, 46 has, in vertical cross section, a convex curved configuration protruding forward. The bumper cover 48 is fixed by bolts or the like to a front grille 50, for instance, that constitutes the front face portion of the vehicle. In FIG. 4, the reference numerals 52, 54 denote a bonnet and a radiator, respectively.

A known impact or shock-absorbing member 56 whose rigidity is smaller than that of the leg-sweep apparatus 10 is disposed inside of the upper protruding portion 44 of the bumper cover 48 such that the impact-absorbing member 56 is fixedly interposed between the upper protruding portion 44 and a bumper reinforcement 58 as a rigid member.

More specifically described, the leg-sweep apparatus 10 is disposed such that the front-side end section of the reinforcing portion 18 of the plate member 12 on which the plurality of reinforcing beads 20 are formed is inserted into the lower protruding portion 46 of the bumper cover 48 with the front-side end section projected forward from the front face of the vehicle and such that, with the flat portion 14 of the base plate 12 extended horizontally in the frontward and backward direction, the upper surface of the rear-side end section of the flat portion 14 is held in contact with the lower surface of a radiator support 60 that is fixedly provided at a front portion of the vehicle so as to extend in the vehicle width direction for supporting a radiator 54. Fixing bolts 62 are respectively inserted into the plurality of insertion holes 16 formed at the rear-side end section of the flat portion 14 and screwed into the radiator support 60, whereby the flat portion 14 of the base plate 12 is fixed at its rear-side end section to the radiator support 60.

Thus, the leg-sweep apparatus 10 is disposed in the lower part of the front face of the vehicle and fixedly positioned such that the entirety of the base plate 12 is located to extend parallel with a horizontal plane which includes the input direction of the impact load to be inputted to the bumper cover 48 and such that the impact-input surface 34 is opposed to the inner surface of the lower protruding portion 46 of the bumper cover 48 so as to be orthogonal to the input direction of the impact load, the impact-input surface 34 being constituted by the vertically extending forward wall portions 26 provided at the front ends of the respective reinforcing beads 20 and the vertically extending forward wall portions 32 provided at the front ends of the side portions 30 each located between any adjacent two reinforcing beads 20.

Figure 5:
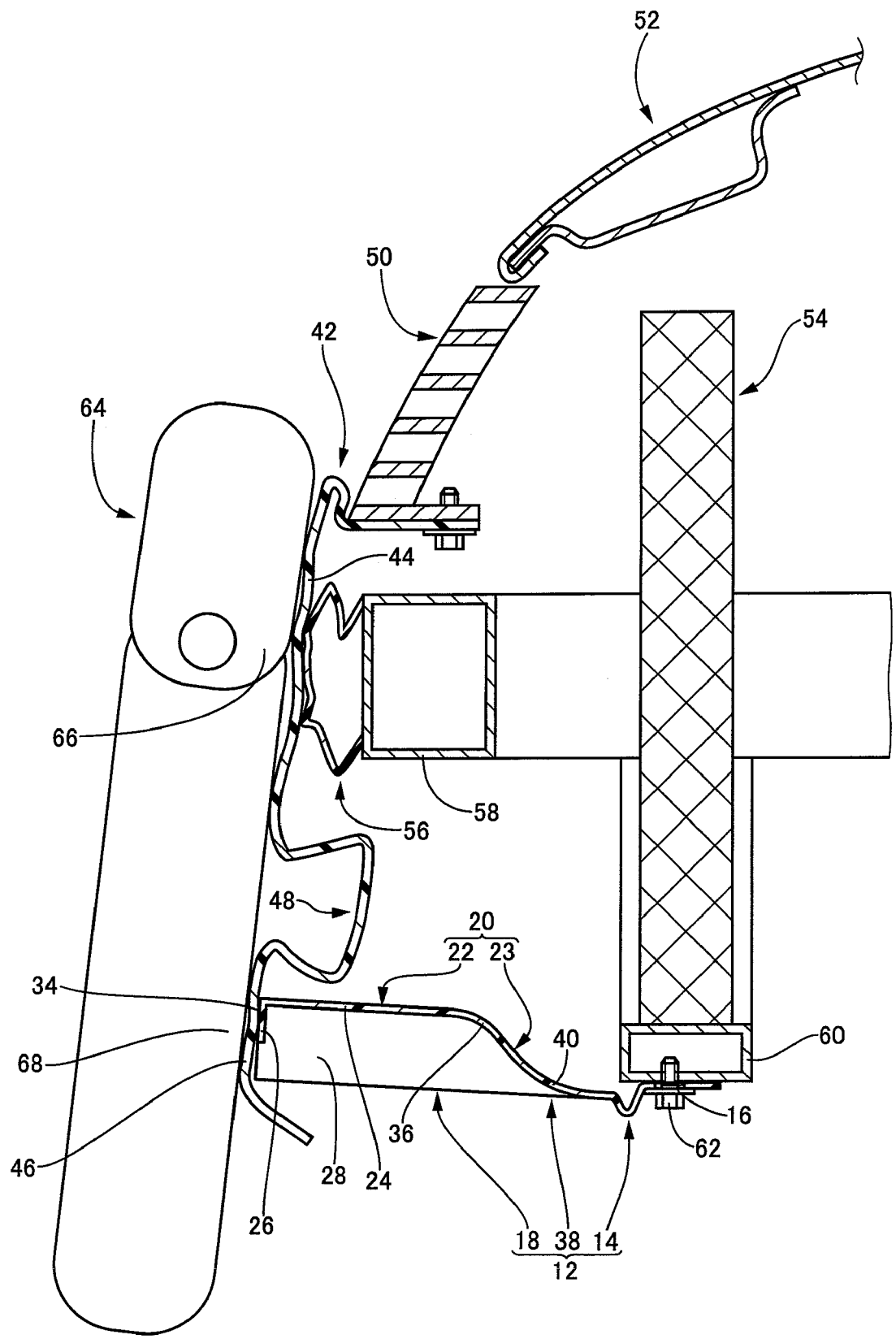
FIG. 5 is an explanatory view showing a deformation state of the pedestrian protection apparatus of FIG. 1 upon collision of a pedestrian with a front face of the vehicle.

In the leg-sweep apparatus 10 according to the present embodiment, when a leg portion 64 of the pedestrian comes into contact or collides with the bumper cover 48 of the front bumper 42 as shown in FIG. 5, the upper protruding portion 44 and the lower protruding portion 46 of the bumper cover 48 are respectively brought into contact with the vicinity of a knee 66 and the vicinity of a shank 68 of the leg portion 64 of the pedestrian. In this instance, since the rigidity of the impact-absorbing member 56 is made smaller than that of the leg-sweep apparatus 10, the impact-absorbing member 56 is deformed more easily in a larger amount than the leg-sweep apparatus 10. Accordingly, the bumper cover 48 is deformed such that the lower protruding portion 46 projects frontward of the vehicle farther than the upper protruding portion 44, so that the counterforce with respect to the impact load generated in the leg-sweep apparatus 10 by the collision of the leg portion 64 against the bumper cover 48 acts on the vicinity of the shank 68 of the leg portion 64 of the pedestrian via the lower protruding portion 46 of the bumper cover 48. As a result, the vicinity of the shank 68 of the leg portion 64 of the pedestrian is swept or scooped up by the leg-sweep apparatus 10, thereby causing the pedestrian to fall down or to be thrown toward the bonnet 52 of the vehicle. Thus, it is possible to limit bending of the knee 66 of the pedestrian in an unnatural or undesirable direction, thereby minimizing occurrence of injuries to the knee 66 such as bone fractures and effectively assuring protection and safety of the pedestrian.

In the present leg-sweep apparatus 10, in particular, the curved connecting portion 40 constituted by the connecting portion of the bead-end portion 23 of each reinforcing bead 20 and the flat portion 14 is gently curved as described above, whereby it is possible to reduce or eliminate occurrence of stress concentration on the curved connecting portion 40 when the impact is inputted. Accordingly, the boundary portion 38 between the reinforcing portion 18 and the flat portion 14 of the base plate 12 at which each curved connecting portion 40 is located is effectively prevented from being easily flexed or deformed by the inputted impact load generated upon collision of the leg portion 64 of the pedestrian against the bumper cover 48.

Further, in the present leg-sweep apparatus 10, the curved boundary portion 36 constituted by the boundary portion between the bead-extending portion 22 and the bead-end portion 23 of each reinforcing bead 20 is gently curved, whereby it is possible to reduce or eliminate occurrence of stress concentration on the curved boundary portion 36 when the impact is inputted, thus enhancing the deformation strength of the reinforcing portion 18.

Further, under installation of the leg-sweep apparatus 10 on the vehicle, the impact load is inputted orthogonally to the impact-input surface 34 of the reinforcing portion 18 that is disposed so as to be opposed to the inner surface of the lower protruding portion 46 of the bumper cover 48. Therefore, the arrangement is effective to prevent generation of a force that acts, upon inputting of the impact load, on the reinforcing portion 18 to lift the reinforcing portion 18 upward or lower the same 18 downward, thereby advantageously preventing easy deformation of the reinforcing portion 18 of the base plate 12 and the boundary portion 38 between the reinforcing portion 18 and the flat portion 14.

In the thus constructed leg-sweep apparatus 10, therefore, when the impact load is inputted to the impact-input surface 34, the impact load is applied to the flat portion 14 via the reinforcing portion 18 in a substantially horizontal direction without suffering from flexing deformation of the reinforcing portion 18 and the boundary portion 38, so that the flat portion 14 can undergo buckling deformation with high reliability and with high efficiency, obviating a delay in the rise of the impact load in the load characteristics.

Accordingly, the present leg-sweep apparatus 10 constructed as described above allows the impact load in the load characteristics to rise promptly and to reach the target value quickly, thereby effectively ensuring excellent impact performance that permits a sufficiently high degree of counterforce to be instantaneously exhibited with respect to the impact load. As a result, the present leg-sweep apparatus 10 is capable of promptly and reliably sweeping the leg portion of the pedestrian collided with the front face of the vehicle for protecting the leg portion of the pedestrian with higher reliability.

In the leg-sweep apparatus 10 constructed as described above, the air flow which has entered the inside of each reinforcing bead 20 during running of the vehicle on which the apparatus 10 is installed smoothly flows backward while being guided by the inclined surface portion 45 and the convex curved surface portion 43 of the inner surface of the bead-end portion 23 of each reinforcing bead 20, whereby the air resistance can be advantageously reduced, as compared with the conventional apparatus. Therefore, the present apparatus 10 achieves improved aerodynamic characteristics and thereby realizes improved running stability and improved fuel consumption of the vehicle.

The leg-sweep apparatus 10 according to the illustrated first embodiment may be otherwise embodied.

In the illustrated first embodiment, all of the reinforcing beads 20 are constituted to have the channel-like configuration which is open downward. The direction in which the reinforcing beads 20 are open is not particularly limited. Namely, all of the reinforcing beads 20 may be constituted to have a channel-like configuration which is open upward.

Alternatively, some of the reinforcing beads 20 may have the channel-like configuration which is open downward while the rest of the reinforcing beads 20 may be constituted to have the channel-like configuration which is open upward.

The cross sectional shape of each reinforcing bead 20 taken along the plane perpendicular to the frontward and backward direction is not limited to the U-shape illustrated above, but may be arcuate, curved, or polygonal, for instance. It is not necessary that the above-indicated cross sectional shapes of the respective reinforcing beads 20 be made identical to each other.

In the illustrated first embodiment, the bead-end portion 23 of each reinforcing bead 20 is in the form of an inclined plate which extends backward from the rear-side edge of the upper bottom wall portion 24 of the corresponding bead-extending portion 22 while being inclined. The bead-end portion 23 may be configured to extend integrally from the rear-side edge of the upper bottom wall portion 24 in the vertically downward or vertically upward direction.

It is needless to mention that the number and the location of the reinforcing beads 20, the dimensions of constituent components of each reinforcing bead 20 and the like may be suitably changed.

Where the number of the reinforcing beads 20 which are arranged parallel to each other in the leftward and rightward direction is increased by decreasing the width of each reinforcing bead 20, the rigidity of the base plate 12 is accordingly increased. Therefore, the rigidity of the base plate 12 can be easily tuned by suitably adjusting the number of the reinforcing beads 20.

In the illustrated first embodiment, the entirety of the leg-sweep apparatus 10 is formed using the synthetic resin material. The material of the leg-sweep apparatus 10 as the pedestrian protection apparatus is not limited to the synthetic resin material. There may be used, for instance, a metal material such as aluminum or an aluminum alloy which is comparatively lightweight and excellent in formability.

The installation structure of the pedestrian protection apparatus (the leg-sweep apparatus 10) on the lower part of the front of the vehicle is not particularly limited. Namely, the portion of the vehicle to which the rear portion (the flat portion 14) of the plate member (the base plate 12) is fixed and the manner of fixing may be variously changed.

In the illustrated first embodiment, the counterforce with respect to the impact load generated in the leg-sweep apparatus 10 by the collision of the leg portion 64 of the pedestrian against the bumper cover 48 is arranged to act on the vicinity of the shank 68 of the leg portion 64 of the pedestrian via the lower protruding portion 46 of the bumper cover 48. The portion of the leg portion 64 of the pedestrian on which the counterforce with respect to the impact load acts may be suitably changed depending upon the installation position of the leg-sweep apparatus 10.

It is noted that, in addition to the pedestrian protection apparatus disposed inside of the bumper that is fixedly provided on the front face of the automotive vehicles, the principle of the invention is applicable to any pedestrian protection apparatus such as those disposed at the front face of the automotive vehicles independently of the bumper and those installed in various forms on the front face of vehicles other than the automotive vehicles.

EXAMPLE 1

For further clarification, there will be explained an example relating to the illustrated first embodiment. It is to be understood that the invention is not limited to the details of the example. Initially, there was prepared, by carrying out injection molding using polypropylene, a leg-sweep apparatus shown in FIGS. 1-3. In the leg-sweep apparatus, each reinforcing bead has a height of 10-15 mm and a width of 10-15 mm. Further, the radius of curvature $R_1$ of the curved connecting portion constituted by the connecting portion between the bead-end portion of each reinforcing bead and the flat portion of the base plate is 12 mm while the radius of curvature $R_2$ of the curved boundary portion constituted by the boundary portion between the bead-extending portion and the bead-end portion of each reinforcing bead is 20 mm. The thus prepared leg-sweep apparatus 10 was used as an invention apparatus.

For comparison, apart from the invention apparatus indicated above, there was prepared, by carrying out injection molding using polypropylene, a leg-sweep apparatus having a structure similar to that disclosed in the patent publication document JP-A-2002-264541 in which both of (1) the connecting portion of the bead-end portion of each reinforcing bead and the flat portion of the base plate and (2) the boundary portion between the bead-extending portion and the bead-end portion of each reinforcing bead are formed as respective angular folded portions. The thus prepared leg-sweep apparatus was used as a conventional apparatus. The height and the width of each reinforcing bead provided in the conventional apparatus are made equal to those in the invention apparatus.

For each of the invention apparatus and the conventional apparatus, there was obtained, by Computational Fluid Dynamics (CFD), a relationship between resistance value generated in each apparatus and velocity of air flow when each leg-sweep apparatus was positioned in the air flow flowing from the front toward the back. The results are indicated in FIG. 6.

Figure 6:
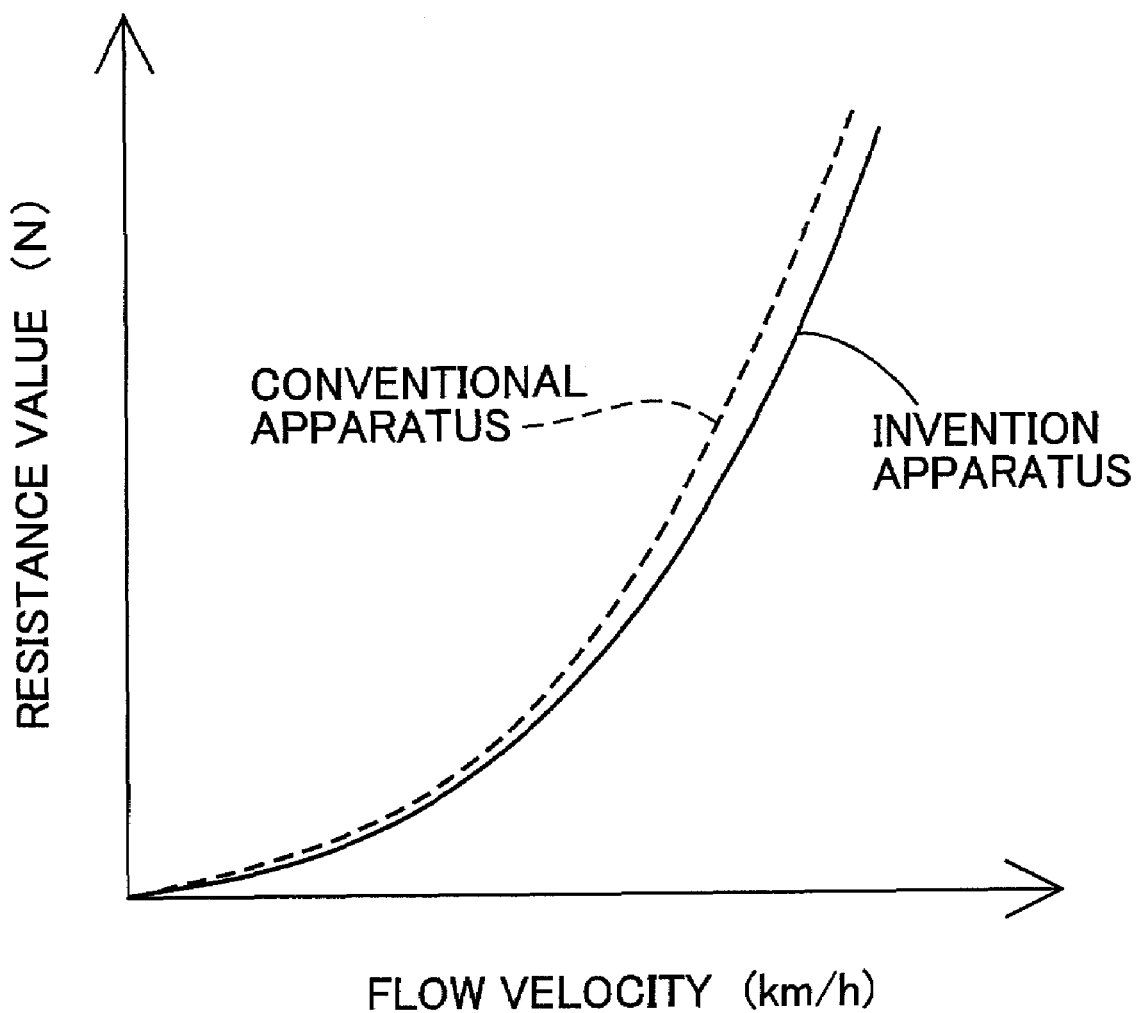
FIG. 6 is a graph showing relationships between resistance value and velocity of air flow obtained by CFD for the pedestrian protection apparatus of the invention and a conventional pedestrian protection apparatus.

As apparent from FIG. 6, the resistance value is kept smaller in the invention apparatus than that in the conventional apparatus under the same flow velocity. It is therefore clearly recognized that the air resistance can be advantageously reduced by forming the connecting portion between the bead-end portion of each reinforcing bead and the flat portion and the boundary portion between the bead-extending portion and the bead-end portion of each reinforcing bead, into the respective gently curved configurations with no folded portions.

Figure 7:
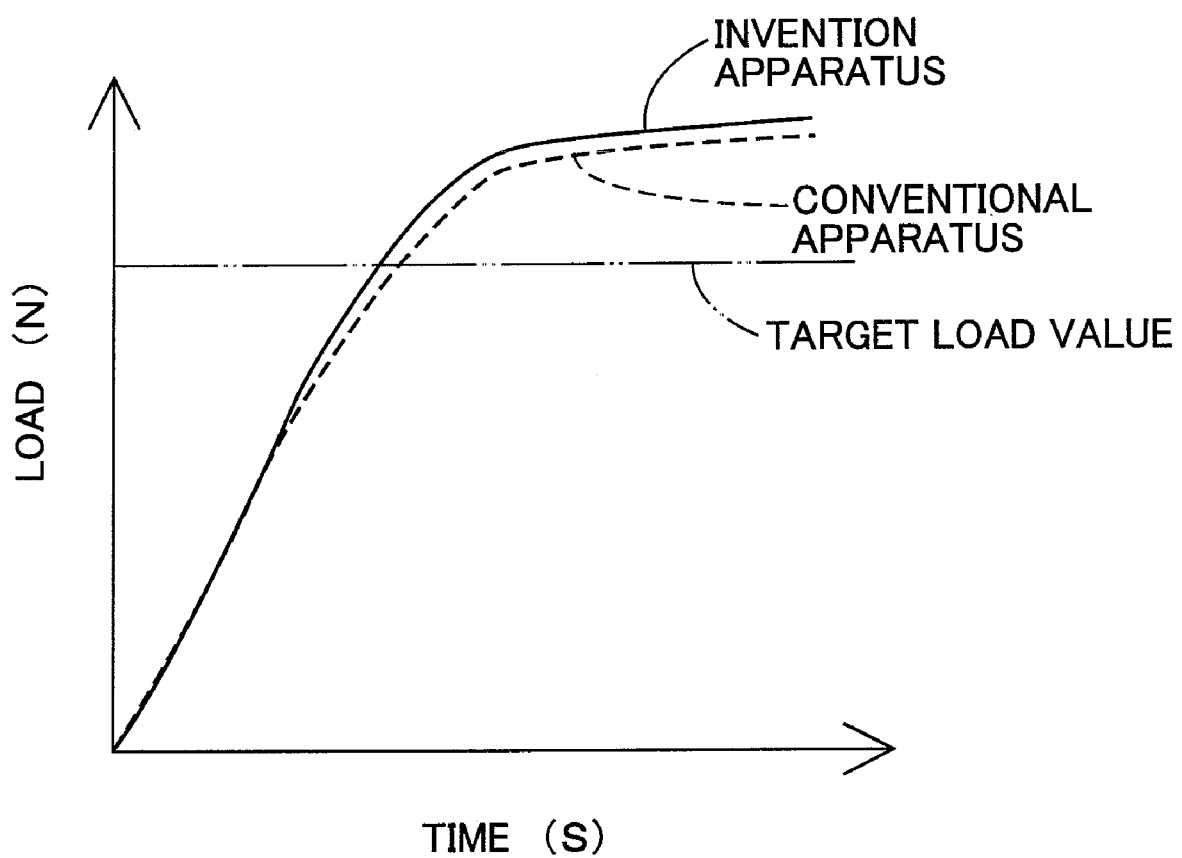
FIG. 7 is a graph showing changes in impact load with time obtained by conducting pedestrian collision tests for the pedestrian protection apparatus of the invention and the conventional pedestrian protection apparatus.

Further, the invention apparatus and the conventional apparatus were actually installed on respective vehicles such that each apparatus was disposed inside of the bumper cover of the front bumper fixedly provided on the front face of each vehicle, as shown in FIG. 4. Thus, there were prepared two test vehicles on which were installed the two leg-sweep apparatus having mutually different structures. Using the thus prepared two test vehicles, there were conducted pedestrian collision tests on the supposition of a collision of a pedestrian with the front bumper of each test vehicle for examining, according to a known manner, changes in the impact load with time inputted to each leg-sweep apparatus upon collision of the pedestrian. The results are indicated in FIG. 7. The pedestrian collision tests were conducted such that a dummy having a weight of 13.4 kg was collided with the front face of the front bumper of each test vehicle at a speed of 40 km/h.

As apparent from FIG. 7, it is recognized that the impact load promptly reached the target value after collision of the pedestrian in the case using the invention apparatus, as compared with the case using the conventional apparatus. This clearly indicates that the counterforce with respect to the impact load can be instantaneously and sufficiently obtained in the leg-sweep apparatus according to the present invention.

2. Second Embodiment

Figure 8:
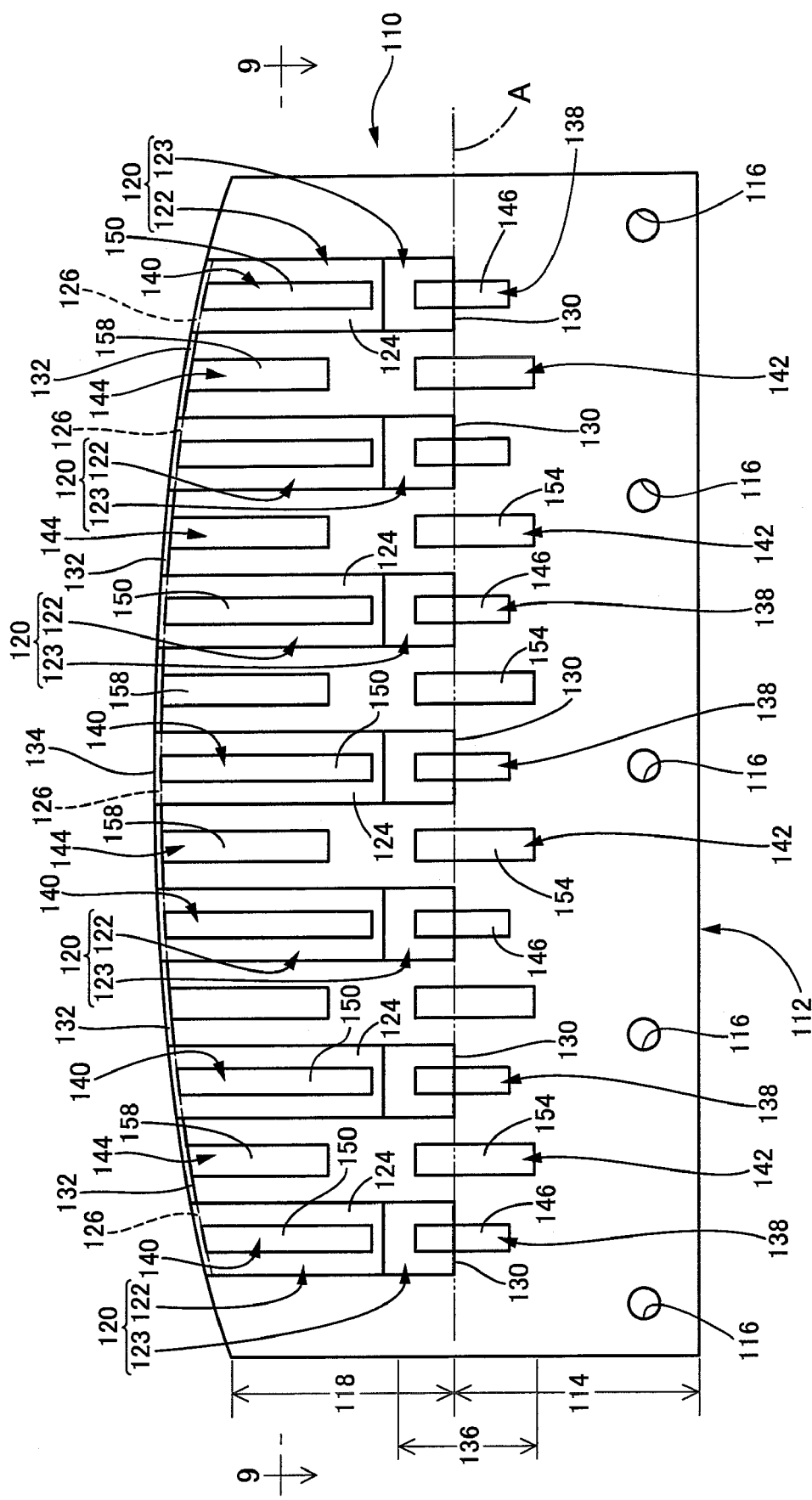
FIG. 8 is a top plan view showing a pedestrian protection apparatus constructed according to a second embodiment of the invention.
Figure 9:
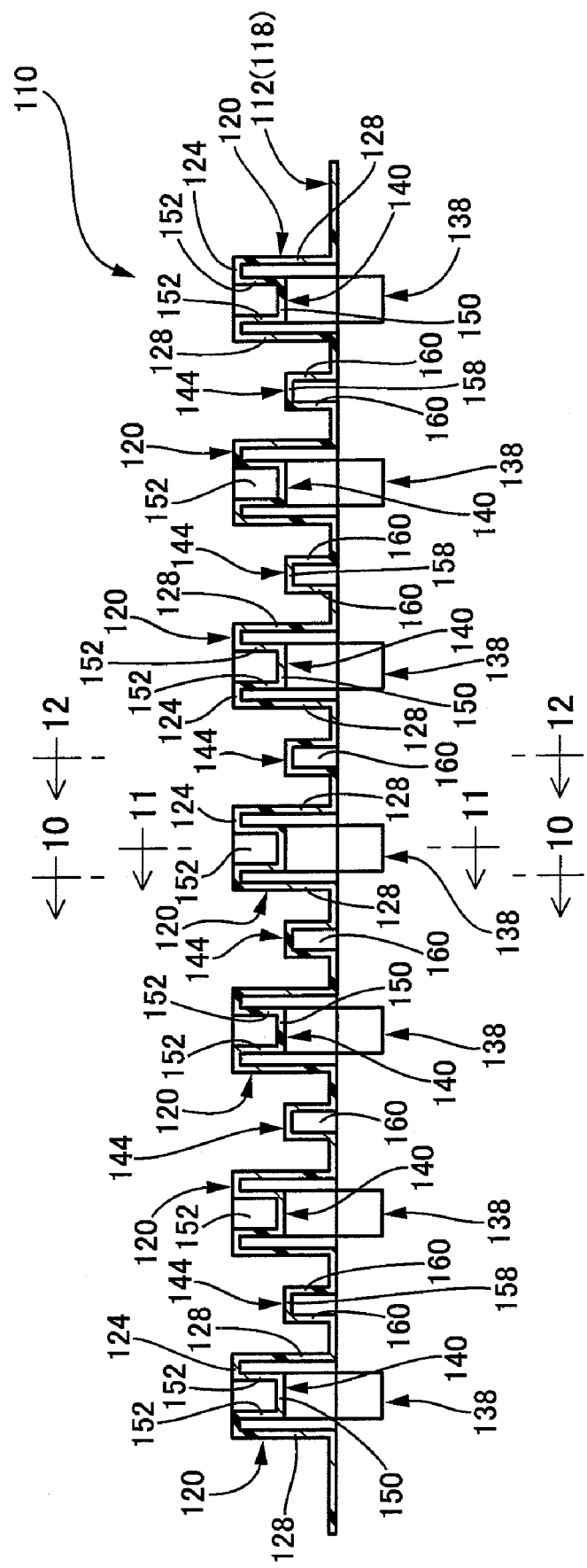
FIG. 9 is a cross sectional view taken along line 9-9 of FIG. 8.

Referring next to FIGS. 8 and 9, there will be explained a leg-sweep apparatus as the pedestrian protection apparatus constructed according to a second embodiment of the present invention. The leg-sweep apparatus generally indicated at 110 in FIGS. 8 and 9 is arranged to be installed inside of the front bumper which is disposed at the front face of the automotive vehicle, like the leg-sweep apparatus 10 in the illustrated first embodiment. As apparent from FIGS. 8 and 9, the present leg-sweep apparatus 110 includes a base plate 112 as a plate member.

The base plate 112 is formed of a synthetic resin material such as polypropylene or ABS resin and is constituted by a thin planar plate having a generally rectangular shape. In the base plate 112, the dimension as measured in a direction extending in a leftward and rightward direction in FIG. 8, i.e., the dimension as measured in the vehicle width direction or the leftward and rightward (lateral) direction of the vehicle under installation of the leg-sweep apparatus 110 on the vehicle, is made smaller than the vehicle width by a suitable amount, and the dimension as measured in a direction extending in an upward and downward direction in FIG. 8, i.e., the dimension as measured in the frontward and backward direction of the vehicle (the vehicle length or running direction), is made sufficiently smaller than the above-indicated dimension as measured in the leftward and rightward direction. Hereinafter, the above-indicated direction extending in the leftward and rightward direction of the vehicle is referred to as "the leftward and rightward direction" while the above-indicated direction extending in the frontward and backward direction of the vehicle is referred to as "the frontward and backward direction".

In the base plate 112, a rear portion which occupies a substantially rear half region thereof is made as a flat portion 114 which has a flat plate-like configuration and which includes an upper surface and a lower surface that extend horizontally under installation of the leg-sweep apparatus 110 on a vehicle. At a rear-side end of the flat portion 114, a plurality of insertion holes 116 (here, five insertion holes 116) into each of which a suitable fixing bolt is insertable are formed through the thickness of the flat portion 114 such that the insertion holes 116 are spaced apart from each other by a suitable distance in the leftward and rightward direction.

A front portion of the base plate 112 except for the flat portion 114 is made as a reinforcing portion 118 having a reinforcement structure. Namely, there are formed a plurality of reinforcing beads 120 (here, seven reinforcing beads 120) integrally on an intermediate region of the reinforcing portion 118 except both side-end regions thereof in the leftward and rightward direction. The reinforcing beads 120 are adjacent to and spaced apart from each other by a constant distance in the leftward and rightward direction and provide a sufficient reinforcement structure.

Figure 10:
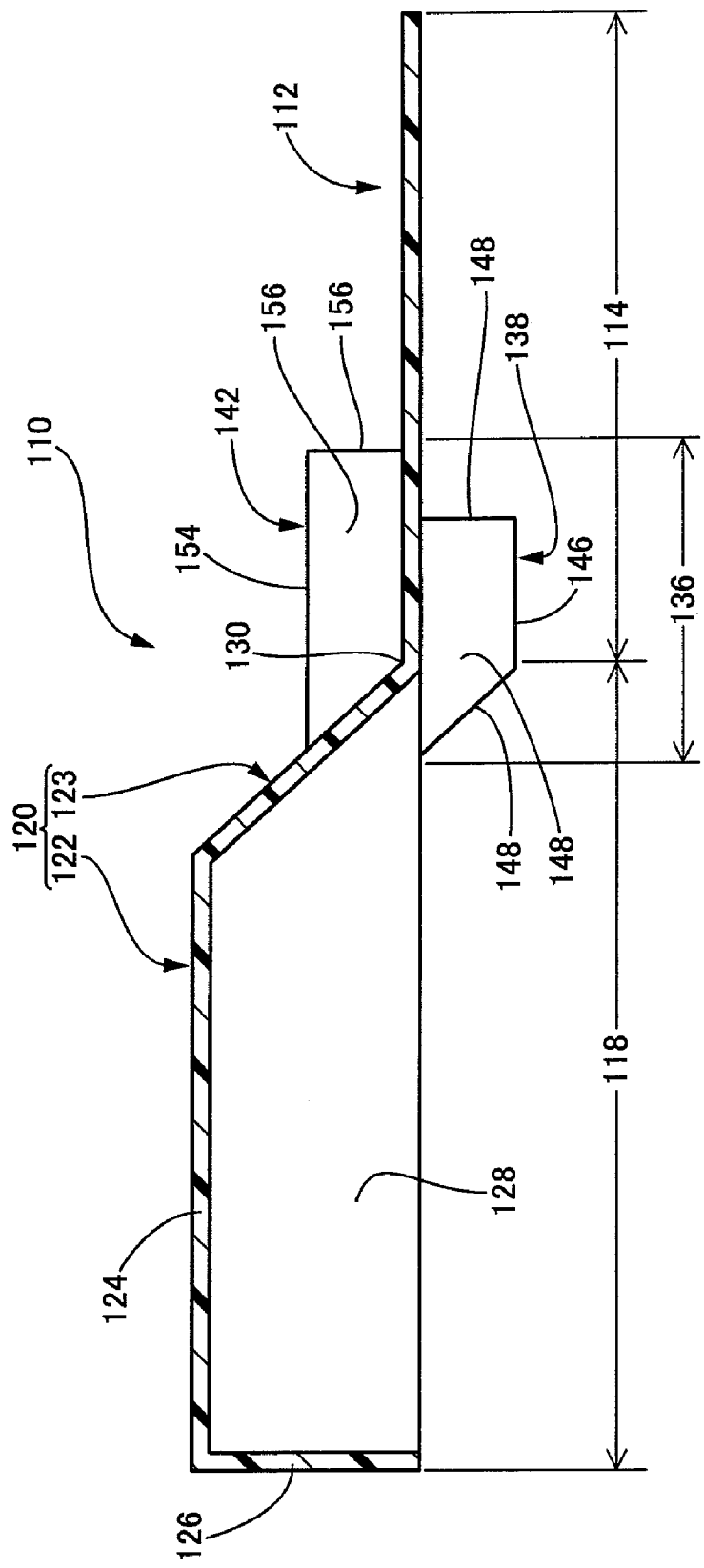
FIG. 10 is an enlarged cross sectional view taken along line 10-10 of FIG. 9.

In detail, each reinforcing bead 120 is constituted by including a bead-extending portion 122 which extends continuously in the frontward and backward direction and a bead-end portion 123 which extends from a rear-side edge of the bead-extending portion 123, as shown in FIGS. 8-10.

The bead-extending portion 122 of each reinforcing bead 120 includes: an upper bottom wall portion 124; a vertically extending forward wall portion 126; and two side wall portions 128, 128. The upper bottom wall portion 124 generally has a rectangular shape having a comparatively small width and is located at a height position which is higher by a suitable distance than an upper surface of each of in-between sections of the reinforcing portion 118 that are located between any adjacent two reinforcing beads 120 and the upper surface of the flat portion 114 that is flush and continuous with the upper surface of each in-between section of the reinforcing portion 118, such that the upper bottom wall portion 124 extends parallel with those upper surfaces and straightly in the frontward and backward direction. The vertically extending forward wall portion 126 of each bead-extending portion 122 is formed integrally with the corresponding upper bottom wall portion 124 so as to extend from its front-side edge in a vertically downward direction. The two side wall portions 128 of each bead-extending portion 122 have a rectangular shape and are formed integrally with the upper bottom wall portion 124 so as to extend in the vertically downward direction from respective widthwise opposite side edges of the same 124 with a suitable height. Further, the two side wall portions 128 of each bead-extending portion 122 are connected, at front-side edges thereof, integrally to respective widthwise opposite side edges of the vertically extending forward wall portion 126.

In the meantime, the bead-end portion 123 of each reinforcing bead 120 is in the form of an inclined plate which extends from a rear-side edge of the upper bottom wall portion 124 of the corresponding bead-extending portion 122 to a height position of the flat portion 114 while being inclined, at a predetermined angle, downward in the backward direction. The bead-end portion 123 is connected, at its widthwise opposite side-edges, integrally to the rear-side edges of the respective side wall portions of the bead-extending portion 122. Further, bead-end portion 123 is connected, at its rear-side edge, integrally to the leading end of the flat portion 114.

Thus, each reinforcing bead 120 has a generally rectangular box-like configuration extending upwardly and straightly in the frontward and backward direction with the constant height. In other words, each reinforcing bead 120 has a channel-like configuration that extends straightly in the frontward and backward direction with an inverted U-like cross sectional shape which is taken along a plane perpendicular to the frontward and backward direction and which is open downward.

The plurality of reinforcing beads 120 are arranged in the intermediate region of the reinforcing portion 118 such that the side wall portions 128 of the respective reinforcing beads 120 are opposed to and spaced apart from each other in the leftward and rightward direction by a predetermined distance. Each reinforcing bead 120 is connected, at a rear-side edge of its bead-end portion 123, to the leading end of the flat portion 114 on a boundary line A (indicated by a two-dot line in FIG. 8) between the reinforcing portion 118 and the flat portion 114 of the base plate 120. This connecting portion between the bead-end portion 123 of each reinforcing bead 120 and the flat portion 114 is made as a bent portion 130 which extends in the leftward and rightward direction with the same width as the reinforcing bead 120 and which protrudes downward. In the leg-sweep apparatus 110, the bent portions 130 are located on the above-indicated boundary line A between the reinforcing portion 118 and the flat portion 114 of the base plate 112 so as to be spaced apart from each other by a predetermined distance in the leftward and rightward direction.

In the thus constructed leg-sweep apparatus 110, the plurality of reinforcing beads 120 are formed integrally on the reinforcing portion 118 of the base plate 112, thereby imparting a sufficiently high degree of rigidity to the reinforcing portion 118, i.e., the front portion of the base plate 112. Accordingly, the reinforcing portion 118 has increased strength with respect to flexing deformation.

As apparent from FIG. 8, in the present leg-sweep apparatus 110, there are provided vertically extending forward wall portions 132 on the front-side edge of the reinforcing portion 118 between any adjacent two reinforcing beads 120, such that the vertically extending forward wall portions 132 extend in the vertically upward direction. The vertically extending forward wall portions 132 are connected integrally to the vertically extending forward wall portions 126 provided on the front-side edges of the bead-extending portions 122 of the respective reinforcing beads 120. According to the arrangement, the front surfaces of the vertically extending forward wall portions 126 of the respective reinforcing beads 120 and the front surfaces of the vertically extending forward wall portions 132 provided on the front-side edge of the reinforcing portion 118 between any adjacent two reinforcing beads 120 cooperate with one another to provide a single continuous surface configuration in plan view. The thus formed continuous surface is made as a curved convex surface that protrudes frontward corresponding to the inner surface of the bumper cover of the front bumper. The front surfaces of the vertically extending wall portions 126, 132 which provide such a continuous curved surface in plan view defines, under installation of the leg-sweep apparatus 110 on the vehicle, an impact-input surface 134 to which is inputted an impact generated upon a collision of a pedestrian against the front face of the vehicle.

In the present leg-sweep apparatus 110, there are formed first through fourth auxiliary beads 138, 140, 142, 144 at respective prescribed locations of the base plate 112, for enhancing the strength of a boundary portion 136 which extends over the rear-side end section of the reinforcing portion 118 and the front-side end section of the flat portion 114 while including the boundary line A between the reinforcing portion 118 and the flat portion 114 of the base plate 112 and for enhancing the strength of a region of the reinforcing portion 118 of the base plate 112 ranging from its intermediate section to its front-side end section in the frontward and backward direction, for instance.

Figure 11:
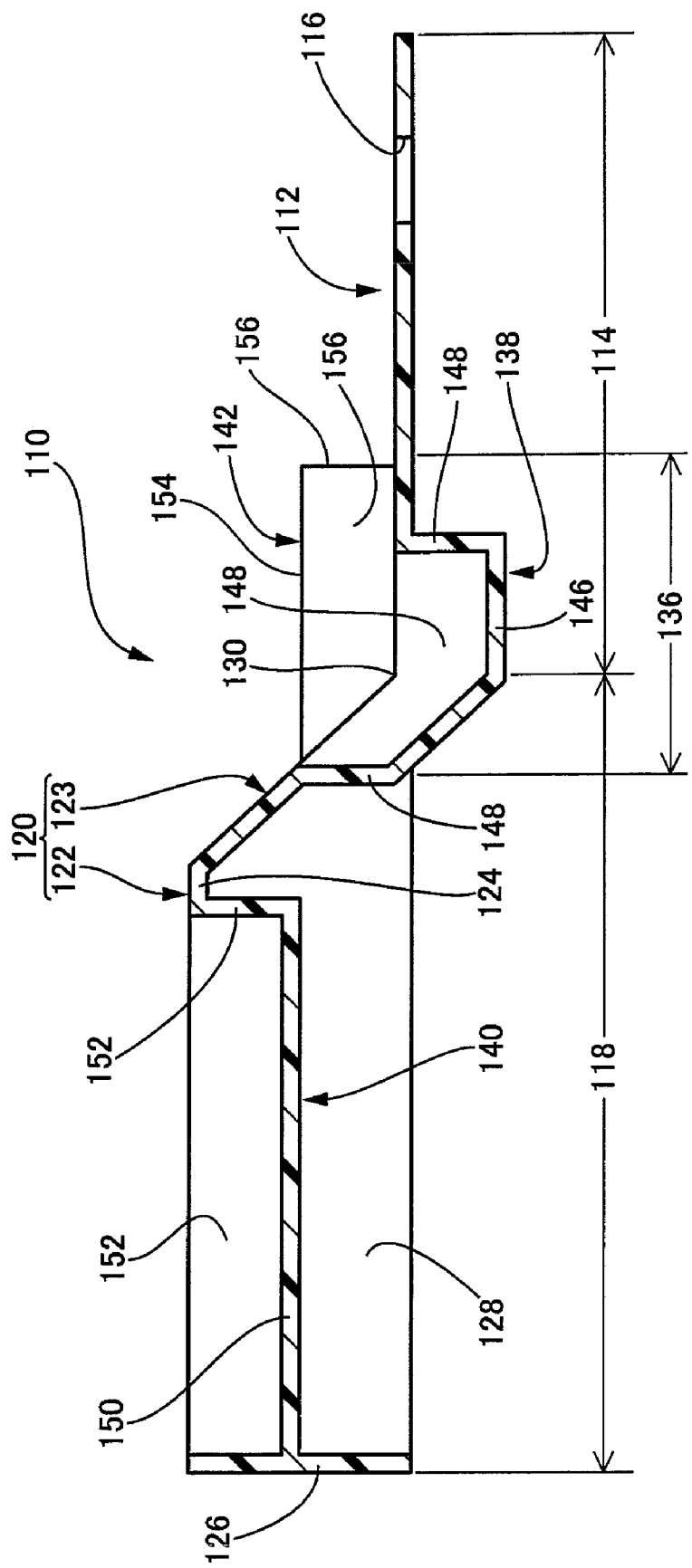
FIG. 11 is an enlarged cross sectional view taken along line 11-11 of FIG. 9.

More specifically explained, as shown in FIGS. 8 and 11, a plurality of first auxiliary beads 138 (here, seven first auxiliary beads 138) are formed integrally on the boundary portion 136 of the base plate 112 such that each of the first auxiliary beads 138 extends continuously in the frontward and backward direction over the bead-end portion 123 of the corresponding reinforcing bead 120 and the front-side end section of the flat portion 114. Further, a plurality of second auxiliary beads 140 (here, seven second auxiliary beads 140) are formed integrally with the respective bead-extending portions 122 of the reinforcing beads 120.

Each of the first auxiliary beads 138 has a lower bottom wall portion 146 and four side wall portions 148 located on the front side, the rear side, the left side, and the right side, respectively. The lower bottom wall portion 146 is a generally rectangular flat plate-like configuration having a width sufficiently smaller than the width of the upper bottom wall portion 124 of the bead-extending portion 122 and than the width of the bead-end portion 123 and a length smaller than the length of the reinforcing bead 120. The lower bottom wall portion 146 of each of the first auxiliary beads 138 is located below the lower surface of the flat portion 114 of the base plate 112 so as to extend in the frontward and backward direction. Further, a lengthwise middle portion of the lower bottom wall portion 146 (a middle portion of the lower bottom wall portion 146 in the frontward and backward direction) is bent at substantially the same angle as the bent portion 130 formed between each bead-end portion 123 and the front-side end section of the flat portion 114 in the boundary portion 136 of the base plate 112. In the lower bottom wall portion 146 configured as described above, the lower surface thereof located forward of the thus bent portion is formed as an inclined surface inclining downward in the backward direction, as shown in FIG. 11.

Each of the four side wall portions 148 of the first auxiliary bead 138 is a flat plate having a rectangular or hexagonal shape and a height smaller than that of the side wall portions 128 of the bead-extending portion 122 of each reinforcing bead 120. The four side wall portions 148 extend in the vertically upward direction respectively from the front-side edge portion, the rear-side edge portion, the left-side edge portion, and the right-side edge portion of the lower bottom wall portion 146, so as to be connected integrally to the bead-end portion 123 and the front-side end section of the flat portion 114.

Thus, each of the first auxiliary beads 138 has a generally rectangular box-like configuration protruding downward in which the lengthwise middle portion is bent such that the forward portion is inclined upward. In other words, each first auxiliary bead 138 has a channel-like configuration whose depth is smaller than that of each reinforcing bead 120 and which extends in a bent form in the frontward and backward direction with a U-like cross sectional shape which is taken along the plane perpendicular to the frontward and backward direction and which is open upward, i.e., which is open in a direction opposite to the direction in which each reinforcing bead 120 is open. The thus configured first auxiliary beads 138 are provided integrally on the boundary portion 136 of the base plate 112 so as to correspond to the respective bent portions 130 formed at the boundary portion 136, such that each first auxiliary bead 138 extends continuously in the frontward and backward direction across the corresponding bent portion 130.

In the meantime, each of the second auxiliary beads 140 has a lower bottom wall portion 150 and three side wall portions 152 located on the rear side, the left side, and the right side, respectively. The lower bottom wall portion 150 has a generally rectangular flat plate-like configuration having substantially the same width as the lower bottom wall portion 146 of each first auxiliary bead 138 and a length sufficiently smaller than that of the upper bottom wall portion 124 of the bead-extending portion 122 of each reinforcing bead 120. Each lower bottom wall portion 150 extends straightly in the frontward and backward direction at a height position which is lower, by a suitable distance, than the lower surface of the upper bottom wall portion 124 of the corresponding bead-extending portion 122 and which is higher, by a suitable distance, than the upper surface of intermediate parts of the reinforcing portion 118 located between any adjacent two reinforcing beads 120. Further, the lower bottom wall portion 150 is connected, at its front edge, integrally to the back surface of the corresponding vertically extending forward wall portion 126 of the bead-extending portion 122. Each of the three side wall portions 152 of the second auxiliary bead 140 is a flat plate with a rectangular shape and has a height smaller than the height of the side wall portions 128 of the bead-extending portion 122 of each reinforcing bead 120. The three side wall portions 152 extend in the vertically upward direction from the respective rear-side, left-side and right-side edges of the lower bottom wall portion 150 so as to be connected integrally to the corresponding upper bottom wall portion 124 of the bead-extending portion 122.

Thus, each of the second auxiliary beads 140 has a generally rectangular box-like configuration which protrudes downward and which straightly extends in the frontward and backward direction with the constant height that is smaller than the height of each reinforcing bead 120. In other words, each second auxiliary bead 140 has a channel-like configuration whose depth is smaller than that of each reinforcing bead 120 and which straightly extends in the frontward and backward direction with a U-like cross sectional shape which is taken along the plane perpendicular to the frontward and backward direction and which is open upward, i.e., which is open in a direction opposite to the direction in which each reinforcing bead 120 is open. The thus configured second auxiliary beads 140 are provided so as to be spaced apart from each other in the leftward and rightward direction on a region of the reinforcing portion 118 of the base plate 112 including its intermediate section and its front-side end section except its rear-side end section, such that each second auxiliary bead 140 is formed integrally on the widthwise middle section of the upper bottom wall portion 124 of the bead-extending portion 122 of the corresponding reinforcing bead 120.

Figure 12:
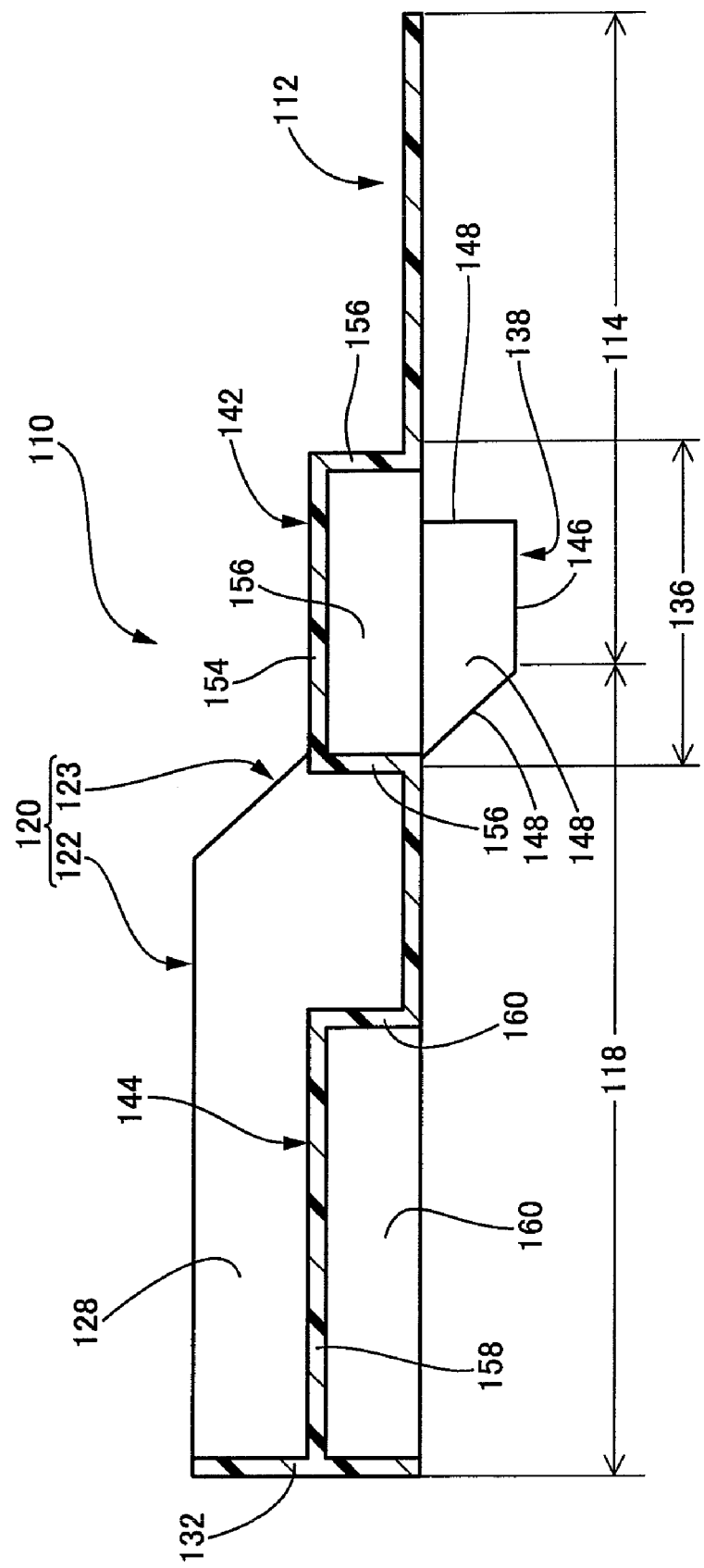
FIG. 12 is an enlarged cross sectional view taken along line 12-12 of FIG. 9.

In the meantime, the third auxiliary beads 142 and the fourth auxiliary beads 144 are formed on respective intermediate parts of the base plate 112 each of which is located between the corresponding two adjacent reinforcing beads 120, such that the third and fourth auxiliary beads 142, 144 extend in the frontward and backward direction, as shown in FIGS. 8 and 12.

Each of the third auxiliary beads 142 has an upper bottom wall portion 154 and four side wall portions 156 located on the front side, the rear side, the left side, and the right side, respectively. Each upper bottom wall portion 154 has a generally rectangular flat plate-like configuration having substantially the same width and length as the lower bottom wall portion 146 of each first auxiliary bead 138. Each upper bottom wall portion 154 is located at a height position which is higher, by a suitable distance, than the upper surface of intermediate parts of the reinforcing portion 118 located between any adjacent two reinforcing beads 120 and than the upper surface of the flat portion 114 that is flush and continuous with the upper surface of the above-indicated intermediate sections of the reinforcing portion 118 and which is lower, by a suitable distance, than the lower surface of the upper bottom wall portion 124 of the bead-extending portion 122 of each reinforcing bead 120. Each upper bottom wall portion 154 extends parallel with those surfaces and straightly in the frontward and backward direction. Each of the four side wall portions 156 is a flat plate having a rectangular shape and has a height smaller than that of the side wall portions 128 of the bead-extending portion 122 of each reinforcing bead 120. The four side wall portions 156 extend in the vertically downward direction from the respective rear-side, left-side and right-side edges of the upper bottom wall portion 154 so as to be connected integrally to the rear-side end section of the reinforcing portion 118 and the front-side end section of the flat portion 114.

Thus, each of the third auxiliary beads 142 has a generally rectangular box-like configuration which protrudes upward and which extends straightly in the frontward and backward direction with the constant height that is smaller than the height of each reinforcing bead 120. In other words, each third auxiliary bead 142 has a channel-like configuration whose depth is smaller than that of each reinforcing bead 120 and which extends straightly in the frontward and backward direction with an inverted U-like cross sectional shape which is taken along the plane perpendicular to the frontward and backward direction and which is open downward, i.e., which is open in the same direction as the direction in which each reinforcing bead 120 is open. The thus configured third auxiliary beads 142 extend continuously in the frontward and backward direction across the boundary line A, such that each third auxiliary bead 142 is provided between the corresponding two of the plurality of bent portions 130 formed on the boundary line A of the boundary portion 136 of the base plate 112, so as to be parallel with and spaced apart from, by a prescribed distance in the leftward and rightward direction, the first auxiliary beads 138 which are located so as to correspond to the respective bent portions 130.

Each of the fourth auxiliary beads 144 has an upper bottom wall portion 158 and three side wall portions 160 located on the rear side, the left side, and the right side, respectively. The upper bottom wall portion 158 has a generally rectangular flat plate-like configuration having substantially the same width and length as those of the second auxiliary beads 140. The upper bottom wall portion 158 of each fourth auxiliary bead 144 is located at a height position which is higher, by a suitable distance, than the upper surface of the intermediate parts of the reinforcing portion 118 located between any adjacent two reinforcing beads 120 and which is lower, by a suitable distance, than the lower surface of the upper bottom wall portion 124 of the bead-extending portion 122 of each reinforcing bead 120. Each upper bottom wall portion 158 extends parallel with those surfaces and straightly in the frontward and backward direction. Each of the three side wall portions 160 is a flat plate having a rectangular shape and has a height smaller than that of the side wall portions 128 of the bead-extending portion 122 of each reinforcing bead 120. The three side wall portions 160 of each fourth auxiliary bead 144 extend in the vertically downward direction from the respective rear-side, left-side, and right-side edges of the upper bottom wall portion 158 so as to be connected integrally to the intermediate part of the reinforcing portion 118 located between the corresponding two adjacent reinforcing beads 120.

Thus, each of the fourth auxiliary beads 144 has a generally rectangular box-like configuration which protrudes upward and which extends straightly in the frontward and backward direction with the constant height that is smaller than the height of each reinforcing bead 120. In other words, each fourth auxiliary bead 144 has a channel-like configuration whose depth is smaller than that of each reinforcing bead 120 and which extends straightly in the frontward and backward direction with an inverted U-like cross sectional shape which is taken along the plane perpendicular to the frontward and backward direction and which is open downward, i.e., which is open in the same direction as the direction in which each reinforcing bead 120 is open. The thus configured fourth auxiliary beads 144 are provided on a region of the reinforcing portion 118 ranging from its intermediate section to its front-side end section in the frontward and backward direction, such that each fourth auxiliary bead 142 is disposed between the corresponding two reinforcing beads 120 so as to be spaced apart in the leftward and rightward direction by a prescribed distance.

In the leg-sweep apparatus 110 constructed according to the exemplary second embodiment, the first auxiliary beads 138 are formed at the boundary portion 136 of the base plate 112 such that each first auxiliary bead 138 extends in the frontward and backward direction across the corresponding bent portion 130 formed between the bead-end portion 123 of the reinforcing bead 120 and the front-side end section of the flat portion 114. Thus, the bent portions 130 are reinforced by the respective first auxiliary beads 138.

Further, each of the first auxiliary beads 138 has a generally rectangular box-like configuration and is connected integrally to the boundary portion 136 of the base plate 112 at the upper ends of the respective four side wall portions 148 remote from the lower bottom wall portion 146. Therefore, when a suitable impact load is inputted to the base plate 112 under installation of the leg-sweep apparatus 110 on the vehicle as described below, the stress generated in the vicinity of each bent portion 130 is distributed over four locations corresponding to the four corner portions formed by the four side wall portions 148 of each first auxiliary bead 138. Accordingly, the stress generated at those four locations can be advantageously reduced or mitigated.

Further, the width of each first auxiliary bead 138 is smaller than that of the bead-end portion 123 of each reinforcing bead 120. Accordingly, even if the connecting portion of the rear-end side wall portion 148 of each first auxiliary bead 138 and the flat portion 114 is bent, the width of such a bent section can be made small. Accordingly, the stress to be generated at such a bent section upon inputting of the impact does not become large to such an extent that causes a serious problem.

In the present leg-sweep apparatus 110, therefore, under installation thereof on the automotive vehicle as described below, it is possible to advantageously reduce or eliminate the stress concentration at each bent portion 130 and its vicinity when a suitable impact load is inputted to the base plate 112.

In the exemplary second embodiment, the third auxiliary beads 142 are provided integrally on the boundary portion 136 of the base plate 112 such that each third auxiliary bead 142 extends continuously in the frontward and backward direction across the boundary line A between the reinforcing portion 118 and the flat portion 114 where the bent portions 130 are located while being disposed adjacent to the first auxiliary beads 138 in the leftward and rightward direction. Accordingly, the deformation strength of the boundary portion 136 of the base plate 112, especially in the vicinity of the boundary line A, can be advantageously increased.

Further, in the present leg-sweep apparatus 110, the second auxiliary beads 140 are formed integrally with the bead-extending portions 122 of the respective reinforcing beads 120 provided on the reinforcing portion 118, so as to extend in the frontward and backward direction, thereby reinforcing the bead-extending portions 122 of the reinforcing beads 120. Moreover, each of the fourth auxiliary beads 144 is formed so as to extend in the frontward and backward direction between the bead-extending portions 122 of the corresponding adjacent two reinforcing beads 120 reinforced by the respective second auxiliary beads 140. Accordingly, each of portions of the base plate 112 which are located between two bead-extending portions 122 of any adjacent two reinforcing beads 120 is sufficiently reinforced. Accordingly, the deformation strength of parts of the reinforcing portion 118 of the base plate 112 at which the bead-extending portions 122 of the reinforcing beads 120 are formed can be more effectively increased.

Figure 13:
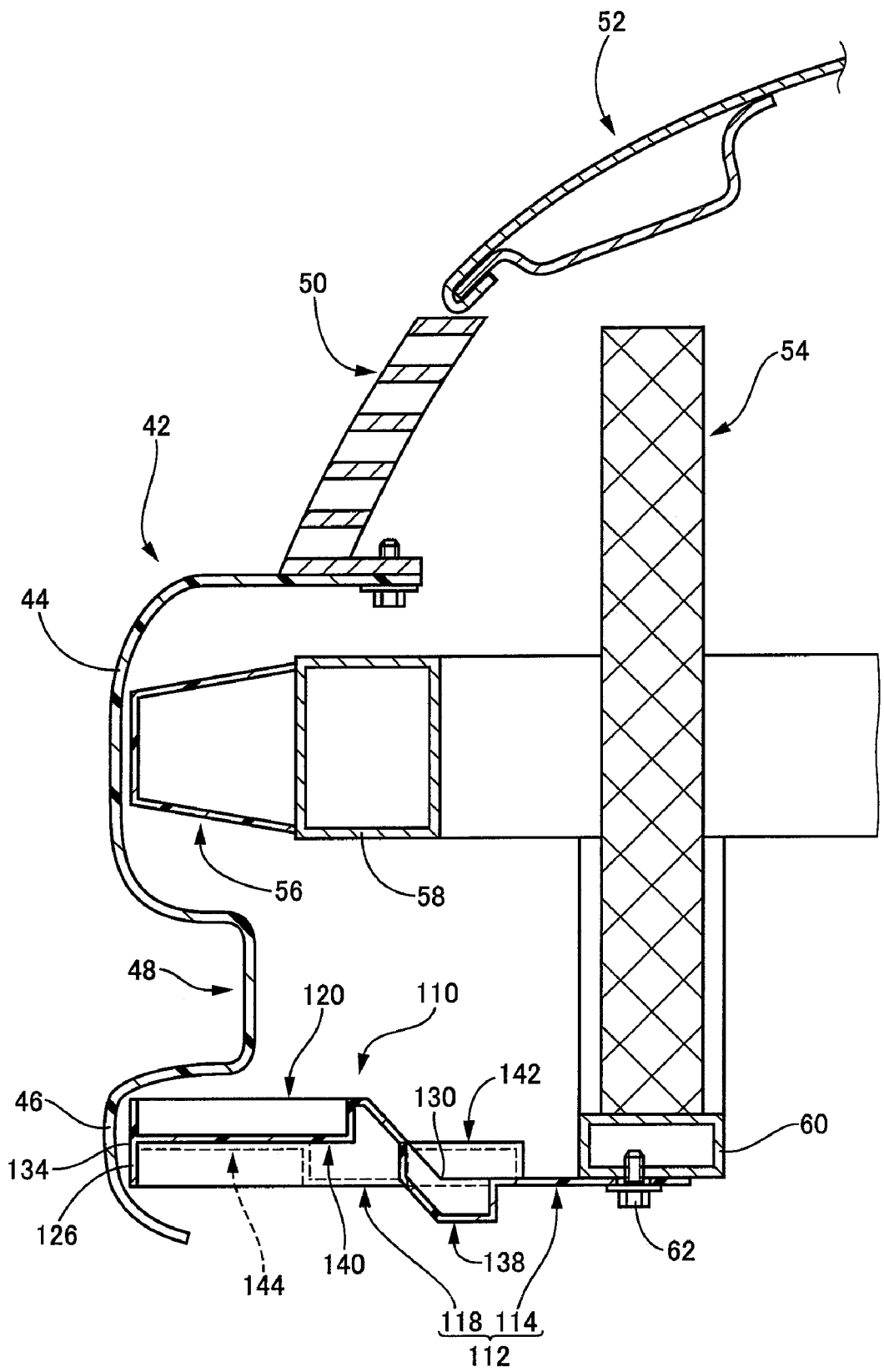
FIG. 13 is an explanatory view showing a state in which the pedestrian protection apparatus of FIG. 8 is installed on a vehicle.

The thus constructed leg-sweep apparatus 110 is disposed inside of the front bumper 42 installed on the front face of the vehicle, as shown in FIG. 13, for example. Because the structure of the front bumper 42 inside of which the leg-sweep apparatus 110 is disposed is the same as that explained with respect the illustrated first embodiment, its detailed description is dispensed with. The front bumper 42 is installed on the front face of the vehicle as explained above with respect to the illustrated first embodiment.

As in the illustrated first embodiment, the impact or shock-absorbing member 56 whose rigidity is smaller than that of the leg-sweep apparatus 110 is disposed inside of the upper protruding portion 44 of the bumper cover 48 such that the impact-absorbing member 56 is fixedly interposed between the upper protruding portion 44 of the bumper cover 48 and the bumper reinforcement 58 as a rigid member.

More specifically described, the leg-sweep apparatus 110 is disposed such that the front-side end section of the reinforcing portion 118 of the base plate 112 on which are formed the reinforcing beads 20, the second auxiliary beads 140, and the fourth auxiliary beads 144 is inserted into the lower protruding portion 46 of the bumper cover 48 with the front-side end section projected forward from the front face of the vehicle and such that, with the flat portion 114 of the base plate 112 extended horizontally in the frontward and backward direction, the upper surface of the rear-side end section of the flat portion 114 is held in contact with the lower surface of the radiator support 60 that is fixedly provided at the front portion of the vehicle so as to extend in the vehicle width direction for supporting the radiator 54. The fixing bolts 60 are respectively inserted into the plurality of insertion holes 116 formed at the rear-side end section of the flat portion 114 and screwed into the radiator support 60, whereby the flat portion 114 of the base plate 112 is fixed at its rear-side end section to the radiator support 60.

Thus, the leg-sweep apparatus 110 is disposed in the lower part of the front face of the vehicle and fixedly positioned such that the entirety of the base plate 112 is located to extend parallel with the horizontal plane which includes the input direction of the impact load to be inputted to the bumper cover 48 and such that the impact-input surface 134 is opposed to the inner surface of the lower protruding portion 46 of the bumper cover 48 so as to be orthogonal to the input direction of the impact load, the impact-input surface 134 being constituted by the vertically extending forward wall portions 126 provided at the front ends of the respective reinforcing beads 120 and the vertically extending forward wall portions 132 provided at the front ends of the intermediate parts of the reinforcing portion 118 each located between any adjacent two reinforcing beads 120.

Figure 14:
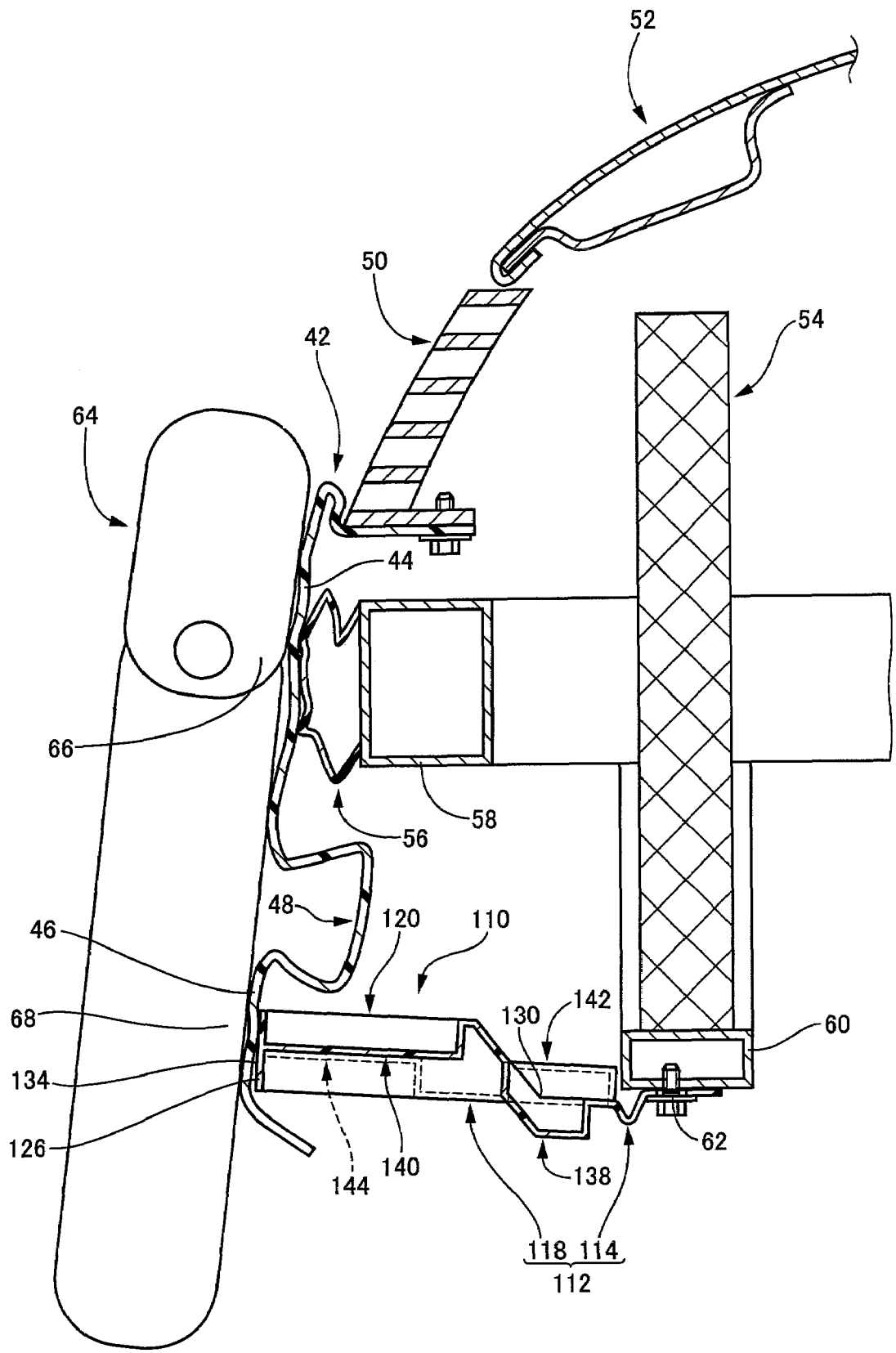
FIG. 14 is an explanatory view showing a deformation state of the pedestrian protection apparatus of FIG. 8 upon collision of a pedestrian with a front face of the vehicle.

In the leg-sweep apparatus 110 according to the exemplary second embodiment, when the leg portion 64 of the pedestrian comes into contact or collides with the bumper cover 48 of the front bumper 42 as shown in FIG. 14, the upper protruding portion 44 and the lower protruding portion 46 of the bumper cover 48 are respectively brought into contact with the vicinity of the knee 66 and the vicinity of the shank 68 of the leg portion 64 of the pedestrian. In this instance, since the rigidity of the impact-absorbing member 56 is made smaller than that of the leg-sweep apparatus 110, the impact-absorbing member 56 is deformed more easily in a larger amount than the leg-sweep apparatus 110. Accordingly, the bumper cover 48 is deformed such that lower protruding portion 46 projects frontward of the vehicle farther than the upper protruding portion 44, so that the counterforce with respect to the impact load generated in the leg-sweep apparatus 110 by the collision of the leg portion 64 against the bumper cover 48 acts on the vicinity of the shank 68 of the leg portion 64 of the pedestrian via the lower protruding portion 46 of the bumper cover 48. As a result, the vicinity of the shank 68 of the leg portion 64 of the pedestrian is swept or scooped up by the leg-sweep apparatus 110, thereby causing the pedestrian to fall down or to be thrown toward the bonnet 52 of the vehicle. Thus, it is possible to limit bending of the knee 66 of the pedestrian in an unnatural or undesirable direction, thereby minimizing occurrence of injuries to the knee 66 such as bone fractures and effectively assuring protection and safety of the pedestrian.

In the present leg-sweep apparatus 110, in particular, the plurality of first and third auxiliary beads 138, 142 are provided at the boundary portion 136 of the base plate 12, whereby it is possible to reduce or eliminate occurrence of the stress concentration on the bent portions 130 at the boundary portion 136 upon inputting of the impact load while advantageously increasing the deformation strength of the boundary portion 136. Therefore, the boundary portion 136 of the base plate 112 is effectively prevented from being easily flexed or deformed by the inputted impact load generated upon collision of the leg portion 64 of the pedestrian against the bumper cover 48.

Further, the plurality of second auxiliary beads 140 and the plurality of fourth auxiliary beads 144 are provided at the region of the reinforcing portion 118 ranging from its front-side end section to its intermediate section, thereby increasing the deformation strength of the above-indicated region. Accordingly, it is possible to effectively prevent the front-side end section of the reinforcing portion 118 from being easily deformed upon inputting of the impact load.

Further, under installation of the leg-sweep apparatus 110 on the vehicle, the impact load is inputted orthogonally to the impact-input surface 134 of the reinforcing portion 118 that is disposed so as to be opposed to the inner surface of the lower protruding portion 46 of the bumper cover 48. The arrangement is effective to prevent generation of a force that acts, upon inputting of the impact load, on the reinforcing portion 118 to lift the reinforcing portion 118 upward or lower the same 118 downward, thereby advantageously preventing easy deformation of the reinforcing portion 118 and the boundary portion 136 of the base plate 112.

In the thus constructed leg-sweep apparatus 110, therefore, when the impact load is inputted to the impact-input surface 134, the impact load is applied to the flat portion 114 via the reinforcing portion 118 in a substantially horizontal direction without suffering from flexing deformation of the reinforcing portion 118 and the boundary portion 136, so that the flat portion 114 can undergo buckling deformation with high reliability and with high efficiency, obviating a delay in the rise of the impact load in the load characteristics.

Accordingly, the present leg-sweep apparatus 110 constructed as described above allows the impact load in the load characteristics to rise promptly and to reach the target value quickly, thereby effectively ensuring excellent impact performance that permits a sufficiently high degree of counterforce to be instantaneously exhibited with respect to the impact load. As a result, the present leg-sweep apparatus 110 is capable of promptly and reliably sweeping of the leg portion of the pedestrian collided with the front face of the vehicle for protecting the leg portion of the pedestrian with higher reliability.

In the present leg-sweep apparatus 110, the height or the width of each of the first through fourth auxiliary beads 138-144 is made sufficiently smaller than the height of each reinforcing bead 120. In addition, each of the second auxiliary beads 140 formed on the upper bottom wall portion 124 of the bead-extending portion 122 of the corresponding reinforcing bead 120 has the U-like cross sectional shape which is taken along the plane perpendicular to the frontward and backward direction and which is open upwards, i.e., which is open in a direction opposite to the direction of opening of each reinforcing bead 120 having the inverted U-like cross sectional shape taken along the above-indicated plane and opening downward. Therefore, the height of the base plate 112 including the reinforcing beads 120 and the auxiliary beads 138-144 is not increased and accordingly the size of the leg-sweep apparatus 110 as a whole is not increased, by provision of the first through fourth auxiliary beads 138-144 on the base plate 112 and by provision of the second auxiliary beads 140 on the bead-extending portions 122 of the reinforcing beads 120 having the predetermined height. In consequence, the arrangement effectively achieves improved impact performance without suffering from an increase in the size of the leg-sweep apparatus 110 as a whole and an increase in the size of the metal molds used for forming the leg-sweep apparatus 110 arising from the size increase of the leg-sweep apparatus 110.

The leg-sweep apparatus 110 according to the illustrated second embodiment may be otherwise embodied.

The direction of opening of each of the first through fourth auxiliary beads 138-144 having the above-indicated U-like or inverted U-like cross sectional shape is not limited to those illustrated above. For instance, at least one of the first auxiliary beads 138 and the second auxiliary beads 140 may be constituted to have an inverted U-like cross sectional shape taken along the plane perpendicular to the frontward and backward direction and opening downward while at least one of the third auxiliary beads 142 and the fourth auxiliary beads 144 may be constituted to have a U-like cross sectional shape taken along the above-indicated plane and opening upward.

The cross sectional shape of each of the first through fourth auxiliary beads 138-144 taken along the plane perpendicular to the frontward and backward direction is not limited to the U-shape illustrated above, but may be arcuate, curved, or polygonal, for instance. It is not necessary that the above-indicated cross sectional shape of each of the auxiliary beads 138-144 be made identical to each other.

In the illustrated second embodiment, each of the first through fourth auxiliary beads 138-144 is constituted independently of each other. However, the auxiliary bead 138 and the second auxiliary bead 140 may be continuous with each other or the third auxiliary bead 142 and the fourth auxiliary bead 144 may be continuous with each other, for instance. In other words, there may be formed, on the base plate 112, auxiliary beads each of which continuously extends in the frontward and backward direction over the front-end section of the flat portion 114 as the rear portion of the base plate 112 and the bead-end and bead-extending portions 123, 122 of each reinforcing bead 120. Further, there may be formed auxiliary beads each of which is located between the corresponding two reinforcing beads 120 so as to continuously extend in the frontward and backward direction from the front-side end section of the reinforcing portion 118 as the front portion of the base plate 112 to the front-side end section of the flat portion 114.

The second auxiliary bead 140 provided on the bead-end portion 122 of each reinforcing bead 120 and the fourth auxiliary bead 144 provided on each intermediate part of the reinforcing portion 118 located between the corresponding two adjacent reinforcing beads 120 may be divided into a plurality of sections arranged in series in the frontward and backward direction.

The width of each of the auxiliary beads 138-144 is not particularly limited, provided that the width is made smaller than that of each reinforcing bead 120.

In the illustrated second embodiment, the first and second auxiliary beads 138, 140 are provided such that one first auxiliary bead 138 and one second auxiliary bead 140 correspond to one reinforcing bead 120. A plurality of first auxiliary beads 138 and a plurality of second auxiliary beads 140 may be provided for one reinforcing bead 120, so as to be arranged side by side in the leftward and rightward direction. The third and fourth auxiliary beads 142, 144, each being provided between any adjacent two reinforcing beads 120, may be provided such that a plurality of third auxiliary beads 142 and a plurality of fourth auxiliary beads 144 may be disposed between any adjacent two reinforcing beads 120 so as to be arranged in the frontward and backward direction or the leftward and rightward direction.

In the illustrated second embodiment, each of the reinforcing beads 120 has the channel-like configuration that is open downward. The reinforcing bead 120 may be constituted to have a channel-like configuration that is open upward.

Figure 15:
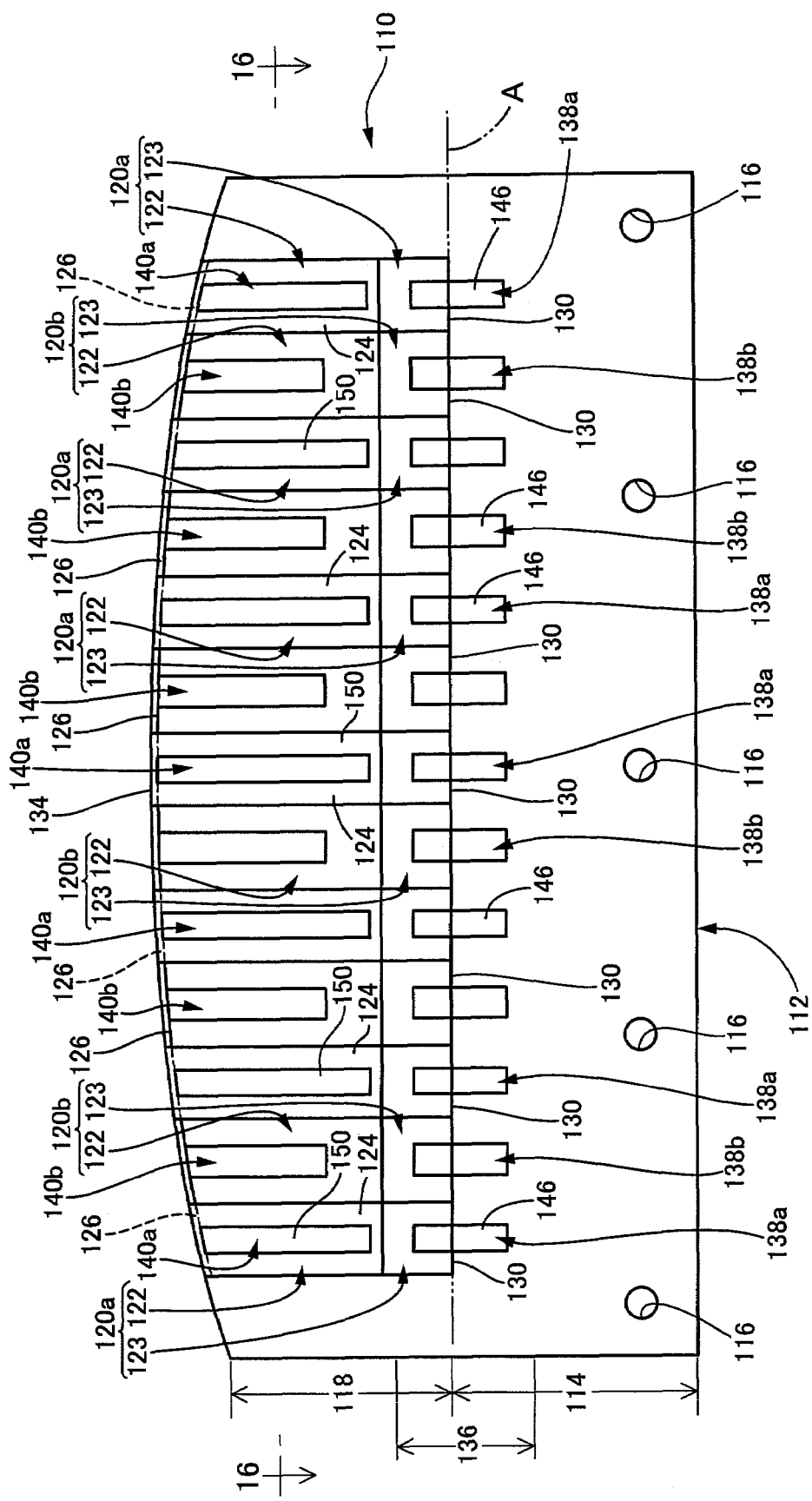
FIG. 15 is a view corresponding to FIG. 1 and showing a modified example of the pedestrian protection apparatus of FIG. 8.
Figure 16:
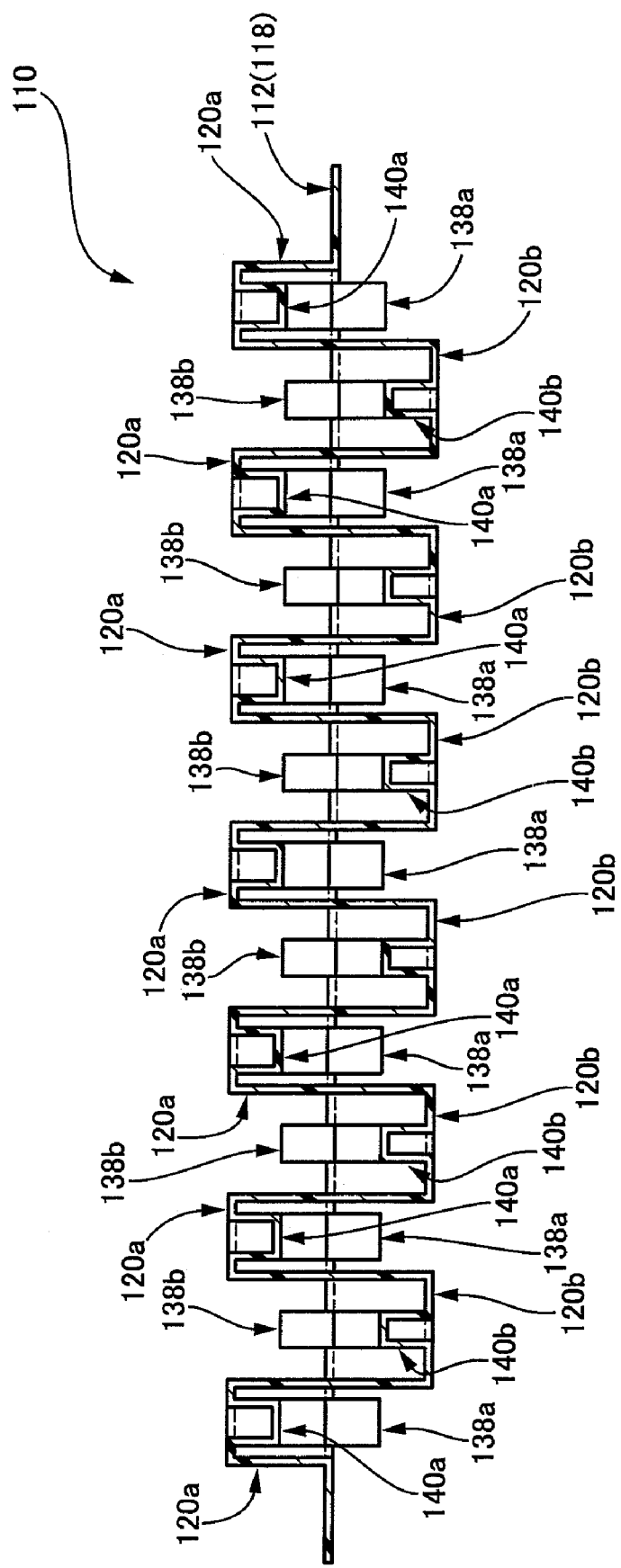
FIG. 16 is a cross sectional view taken along line 16-16 of FIG. 15.

Moreover, the reinforcing beads 120 may be constituted as shown in FIGS. 15 and 16. More specifically explained, first reinforcing beads 120a each having the channel-like configuration that is open downward and second reinforcing beads 120b each having the channel-like configuration that is open upward may be alternately provided in the leftward and rightward direction on the reinforcing portion 118 of the base plate 112. When such a construction is employed, the first auxiliary beads 138a and the second auxiliary beads 140a are formed integrally on the base plate 112 such that the first auxiliary bead 138 and the second auxiliary bead 140 are provided for each first reinforcing bead 120a and such that the first auxiliary bead 138 and the second auxiliary bead 140 are provided for each second reinforcing bead 120b. In the leg-sweep apparatus 110 shown in FIGS. 15 and 16, the first auxiliary bead 138a and the second auxiliary bead 140a provided for each first reinforcing bead 120a have a channel-like configuration that is open upward while the first auxiliary bead 138b and the second auxiliary bead 140b provided for each second reinforcing bead 120b have a channel-like configuration that is open downward. According to the arrangement, the height of the leg-sweep apparatus 110 is minimized, avoiding an increase in the size of the apparatus 110 as a whole. In FIGS. 15 and 16, the same reference numerals as used in FIGS. 8 and 9 are used to identify the corresponding components, and a detailed explanation of which is dispensed with.

In the illustrated second embodiment, the bead-end portion 123 of each reinforcing bead 120 is in the form of an inclined plate which extends integrally from the rear-side edge of the corresponding upper bottom wall portion 124 so as to incline downward in the backward direction. The bead-end portion 123 may be configured to extend integrally from the rear-side edge of the upper bottom wall portion 124 in the vertically downward direction.

It is needless to mention that the number, the location, and the shape of the reinforcing beads 120, the dimensions of the constituent components of each reinforcing bead 120, etc., may be suitably changed.

Where the number of the reinforcing beads 120 and the number of the auxiliary beads 138-144, especially the numbers thereof arranged in parallel in the leftward and rightward direction, are increased, the rigidity of the base plate 112 can be accordingly increased. Therefore, the rigidity of the base plate 112 can be easily tuned by suitably adjusting the numbers of the reinforcing beads 120 and the auxiliary beads 138-144.

In the illustrated second embodiment, the entirety of the leg-sweep apparatus 110 is formed using the synthetic resin material. The material of the leg-sweep apparatus 110 as the pedestrian protection apparatus is not limited to the synthetic resin material. There may be used, for instance, a metal material such as aluminum or an aluminum alloy which is comparatively lightweight and excellent in formability.

The installation structure of the pedestrian protection apparatus (the leg-sweep apparatus 110) on the lower part of the front of the vehicle is not particularly limited. Namely, the portion of the vehicle to which the rear portion of the plate member (the base plate 112) is fixed and the manner of fixing may be variously changed.

In the illustrated second embodiment, the counterforce with respect to the impact load generated in the leg-sweep apparatus 110 by the collision of the leg portion 64 of the pedestrian against the bumper cover 48 is arranged to act on the vicinity of the shank 68 of the leg portion 64 of the pedestrian via the lower protruding portion 46 of the bumper cover 48. The portion of the leg portion 64 of the pedestrian on which the counterforce with respect to the impact load acts may be suitably changed depending upon the installation position of the leg-sweep apparatus 110.

It is noted that, in addition to the pedestrian protection apparatus disposed inside of the bumper that is fixedly provided on the front face of the automotive vehicles, the principle of the invention is applicable to any pedestrian protection apparatus such as those disposed at the front face of the automotive vehicles independently of the bumper and those installed in various forms on the front face of vehicles other than the automotive vehicles

EXAMPLE 2

For further clarification, there will be explained an example relating to the illustrated second embodiment. It is to be understood that the invention is not limited to the details of the example. Initially, there was prepared, by carrying out injection molding using polypropylene, a leg-sweep apparatus shown in FIGS. 8-12. In the leg-sweep apparatus, each reinforcing bead has a height of 30 mm and a width of 30 mm while each of the first through fourth auxiliary beads has a height of 5 mm and a width of 10 mm. Further, the base plate has a thickness of 2.7 mm. The thus prepared leg-sweep apparatus was used as an invention apparatus.

For comparison, apart from the invention apparatus indicated above, there was prepared, by carrying out injection molding using polypropylene, a leg-sweep apparatus having a structure similar to that disclosed in the patent publication document JP-A-2002-284741 in which only reinforcing beads are formed integrally on the front portion (the reinforcing portion) of the base plate so as to be equally spaced apart from each other in the leftward and rightward direction, with no first through fourth auxiliary beads provided. The thus prepared leg-sweep apparatus was used as a conventional apparatus. The height and the width of each reinforcing bead and the thickness of the base plate in the conventional apparatus are made equal to those in the invention apparatus.

Figure 17:
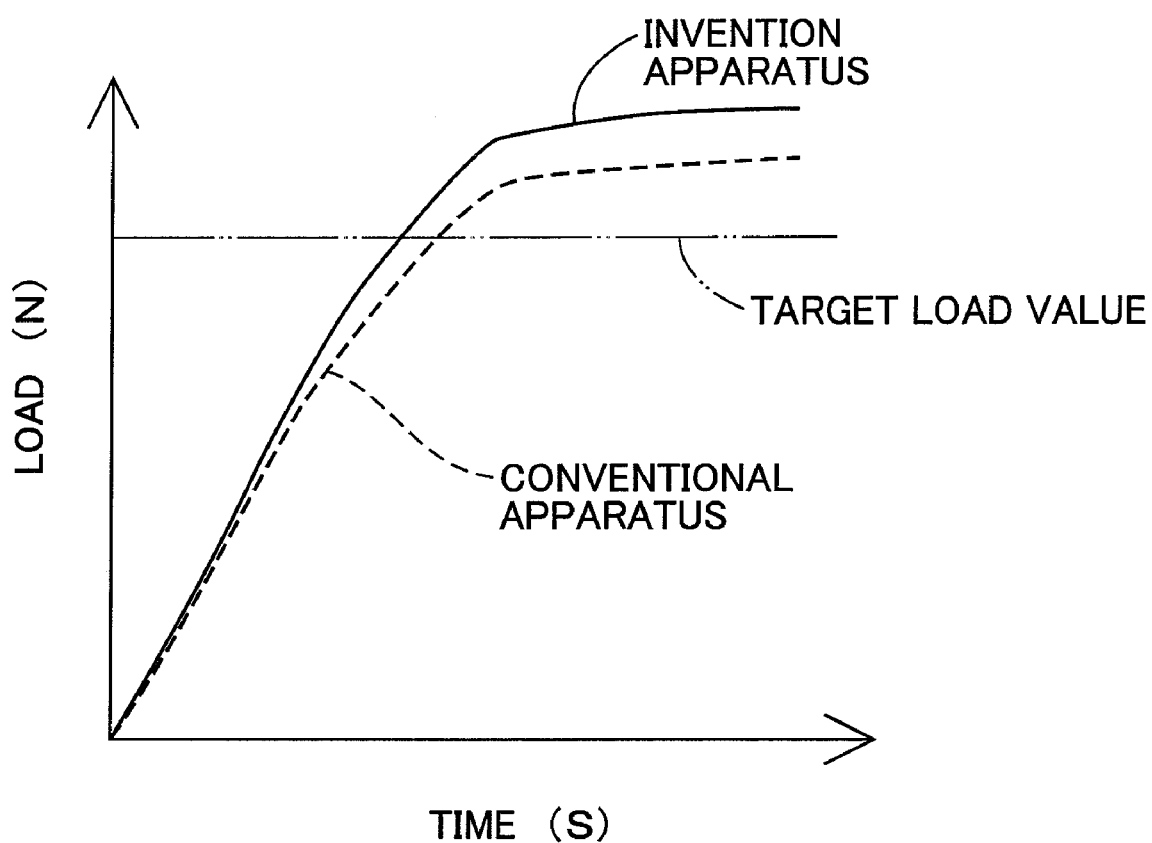
FIG. 17 is a graph showing changes in impact load with time obtained by conducting pedestrian collision tests for the pedestrian protection apparatus of the invention and a conventional pedestrian protection apparatus.

The thus prepared invention apparatus and conventional apparatus were actually installed on respective vehicles such that each apparatus was disposed inside of the bumper cover of the front bumper fixedly provided on the front face of each vehicle, as shown in FIG. 13. Thus, there were prepared two test vehicles on which were installed the two leg-sweep apparatus having mutually different structures. Using the thus prepared two test vehicles, there were conducted pedestrian collision tests on the supposition of a collision of a pedestrian with the front bumper of each test vehicle for examining, according to a known manner, changes in the impact load with time inputted to each leg-sweep apparatus upon collision of the pedestrian. The results are indicated in FIG. 17. The pedestrian collision tests were conducted such that a dummy having a weight of 13.4 kg was collided with the front face of the front bumper of each vehicle at a speed of 40 km/h.

As apparent from FIG. 17, it is recognized that the impact load promptly reached the target value after collision of the pedestrian in the case using the invention apparatus, as compared with the case using the conventional apparatus. This clearly indicates that the counterforce with respect to the impact load can be instantaneously and sufficiently obtained in the leg-sweep apparatus according to the present invention.

It is to be understood that the present invention may be embodied with various other changes and modifications which may occur to those skilled in the art, without departing from the spirit and scope of the invention defined in the following claims.

What is claimed is:

1. A pedestrian protection apparatus for a vehicle, comprising: a plate member which is disposed at a lower part of a front of the vehicle so as to extend in a frontward and backward direction of the vehicle, which includes a front portion and a rear portion, and which is fixed at the rear portion to the vehicle; and at least one reinforcing bead each formed integrally on the front portion of the plate member and each including a bead-extending portion which extends in the frontward and backward direction of the vehicle with a channel-like configuration that is open upward or downward and a bead-end portion which has a plate-like configuration and which extends integrally from a rear-side edge of the bead-extending portion for connecting the rear-side edge of the bead-extending portion and the rear portion of the plate member, the apparatus being arranged to sweep a leg portion of a pedestrian that has collided with the front of the vehicle by contact of a front end of the plate member with the leg portion of the pedestrian, thereby protecting the leg portion of the pedestrian, the apparatus further comprising at least one first auxiliary bead each having a width smaller than a width of each of the at least one reinforcing bead and each extending continuously in the frontward and backward direction of the vehicle over the bead-end portion of a corresponding one of the at least one reinforcing bead and a front-side end section of the rear portion of the plate member.

2. The pedestrian protection apparatus according to claim 1, further comprising at least one second auxiliary bead each of which has a width smaller than a width of each of the at least one reinforcing bead and each of which is formed integrally with the bead-extending portion of a corresponding one of the at least one reinforcing bead so as to extend in the frontward and backward direction of the vehicle.

3. The apparatus according to claim 2, wherein each of the at least one second auxiliary bead has a channel-like configuration that is open in a direction opposite to a direction in which each of the at least one reinforcing bead is open.

4. The apparatus according to claim 1,
wherein the at least one reinforcing bead comprises a plurality of reinforcing beads provided on the front portion of the plate member so as to be spaced apart from each other in a width direction of the vehicle, and
wherein the apparatus further comprises at least one third auxiliary bead each of which has a width smaller than a width of each of the plurality of reinforcing beads and each of which is formed between any adjacent two of the plurality of reinforcing beads so as to extend continuously in the frontward and backward direction of the vehicle over a rear-side end section of the front portion of the plate member and the front-side end section of the rear portion of the plate member.

5. The apparatus according to claim 1,
wherein the at least one reinforcing bead comprises a plurality of reinforcing beads provided on the front portion of the plate member so as to be spaced apart from each other in a width direction of the vehicle, and
wherein the apparatus further comprises at least one fourth auxiliary bead each of which has a width smaller than a width of each of the plurality of reinforcing beads and each of which is formed between any adjacent two of the plurality of reinforcing beads so as to extend continuously in the frontward and backward direction of the vehicle at a front-side end section of the front portion of the plate member.

6. The apparatus according to claim 1, wherein each of the at least one reinforcing bead further includes, at a forward end thereof, a forward wall portion which is formed integrally with the bead-extending portion of a corresponding one of the at least one reinforcing bead, which has a front surface extending in a vertical direction, and which constitutes at least a part of the front end of the plate member.

* * * * *